(12) United States Patent
Constantz

(10) Patent No.: US 11,154,813 B2
(45) Date of Patent: Oct. 26, 2021

(54) MODULAR $CO_2$ SEQUESTRATION UNITS AND SYSTEMS, AND METHODS FOR USING THE SAME

(71) Applicant: Blue Planet Systems Corporation, Los Gatos, CA (US)

(72) Inventor: Brent R. Constantz, Portola Valley, CA (US)

(73) Assignee: Blue Planet Systems Corporation, Los Gatos, CA (US)

( * ) Notice: Subject to any disclaimer, the term of this patent is extended or adjusted under 35 U.S.C. 154(b) by 0 days.

(21) Appl. No.: 15/562,405

(22) PCT Filed: Mar. 25, 2016

(86) PCT No.: PCT/US2016/024338
§ 371 (c)(1),
(2) Date: Sep. 27, 2017

(87) PCT Pub. No.: WO2016/160612
PCT Pub. Date: Oct. 6, 2016

(65) Prior Publication Data
US 2018/0280869 A1    Oct. 4, 2018

Related U.S. Application Data

(60) Provisional application No. 62/139,616, filed on Mar. 27, 2015.

(51) Int. Cl.
*B01D 53/62* (2006.01)
*C01B 32/50* (2017.01)
(Continued)

(52) U.S. Cl.
CPC ............. *B01D 53/62* (2013.01); *B01D 53/78* (2013.01); *C01B 32/50* (2017.08); *C01B 32/60* (2017.08);
(Continued)

(58) Field of Classification Search
CPC .... B01D 43/14; B01D 53/18; B01D 53/1418; B01D 53/1425; B01D 53/1475;
(Continued)

(56) References Cited

U.S. PATENT DOCUMENTS 2,306,021 A * 12/1942 Knowles ................. C03C 1/022
423/340
9,707,513 B2   7/2017 Constantz et al.
(Continued)

FOREIGN PATENT DOCUMENTS

WO   WO 2014/039578 A1   3/2014
WO   WO 2014/144848 A1   9/2014
(Continued)

*Primary Examiner* — Thuan D Dang
(74) *Attorney, Agent, or Firm* — Michael J. Blessent; Bret E. Field; Bozicevic, Field & Francis LLP

(57) ABSTRACT

Shippable modular units configured for use in sequestering $CO_2$ are provided. Aspects of the units include a support having one or more of: a $CO_2$ gas/liquid contactor subunit, a carbonate production subunit and an alkali enrichment subunit; associated therewith. Also provided are systems made up of one or more such modular units, and methods for using the units/systems in $CO_2$ sequestration protocols.

13 Claims, 5 Drawing Sheets

(51) Int. Cl.
*C01B 32/60* (2017.01)
*B01D 53/78* (2006.01)
*C02F 9/00* (2006.01)
*C02F 1/44* (2006.01)
*C02F 101/10* (2006.01)
*C02F 103/18* (2006.01)

(52) U.S. Cl.
CPC ........ *C02F 9/005* (2013.01); *B01D 2251/606* (2013.01); *B01D 2252/103* (2013.01); *B01D 2258/0233* (2013.01); *B01D 2258/0283* (2013.01); *B01D 2259/455* (2013.01); *C01B 2210/0003* (2013.01); *C02F 1/441* (2013.01); *C02F 1/442* (2013.01); *C02F 1/444* (2013.01); *C02F 2101/10* (2013.01); *C02F 2103/18* (2013.01); *C02F 2201/007* (2013.01); *Y02A 50/20* (2018.01); *Y02C 20/40* (2020.08); *Y02W 10/37* (2015.05)

(58) Field of Classification Search
CPC ........ B01D 53/22; B01D 53/62; B01D 53/73; Y02C 10/06; Y02C 10/08; Y02C 10/04; Y02C 10/10
USPC ............ 95/139, 183, 205, 223, 236; 96/234; 423/437.1, 420, 419.1, 430
See application file for complete search history.

(56) References Cited

U.S. PATENT DOCUMENTS

| | | |
|---|---|---|
| 9,714,406 B2 | 7/2017 | Constantz et al. |
| 2009/0127127 A1 | 5/2009 | Jones |
| 2010/0064890 A1 | 3/2010 | Keith et al. |
| 2010/0230830 A1* | 9/2010 | Farsad ............... B01D 53/1456 261/20 |
| 2011/0300043 A1 | 12/2011 | Sano et al. |
| 2014/0093441 A1 | 4/2014 | Jones et al. |
| 2014/0209308 A1* | 7/2014 | Baldasaro ............... E21B 33/14 166/293 |
| 2014/0271440 A1 | 9/2014 | Constantz et al. |
| 2014/0322803 A1 | 10/2014 | Constantz et al. |
| 2014/0370242 A1 | 12/2014 | Constantz et al. |
| 2016/0082387 A1 | 3/2016 | Constantz et al. |
| 2016/0121298 A1 | 5/2016 | Constantz et al. |
| 2016/0176721 A1 | 6/2016 | Bewernitz et al. |
| 2017/0240747 A1 | 8/2017 | Constantz et al. |
| 2017/0274318 A1 | 9/2017 | Constantz et al. |
| 2017/0361270 A1 | 12/2017 | Constantz et al. |

FOREIGN PATENT DOCUMENTS

| | | |
|---|---|---|
| WO | WO 2015/134408 A1 | 9/2015 |
| WO | WO 2016/033446 A1 | 3/2016 |
| WO | WO 2016/057709 A2 | 4/2016 |
| WO | WO 2017/165849 A1 | 9/2017 |

* cited by examiner

MODULAR $CO_2$ SEQUESTRATION UNITS AND SYSTEMS, AND METHODS FOR USING THE SAME

CROSS-REFERENCE TO RELATED APPLICATION

Pursuant to 35 U.S.C. § 119(e), this application claims priority to the filing date of U.S. Provisional Application Ser. No. 62/139,616 filed on Mar. 27, 2015; the disclosure of which application is herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. Because human activities since the industrial revolution have rapidly increased concentrations of atmospheric $CO_2$, anthropogenic $CO_2$ has been implicated in global warming and climate change, as well as ocean acidification.

Sequestration of anthropogenic $CO_2$ is of great global urgency and is important in efforts to slow or reverse global warming and ocean acidification.

SUMMARY

Shippable modular units configured for use in sequestering $CO_2$ are provided. Aspects of the units include a support, e.g., a housing or base, having associated therewith one or more of: a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are systems made up of one or more such modular units. Systems disclosed herein include large capacity systems, where individual modular units may contain only one type or more of a given subunit, e.g., a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Aspects of the invention include larger assemblages of multiple individual modular units that are engaged and may have one or many individual modular units that include a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are methods of using the units/systems in $CO_2$ sequestration protocols.

DETAILED DESCRIPTION

Figure 1:
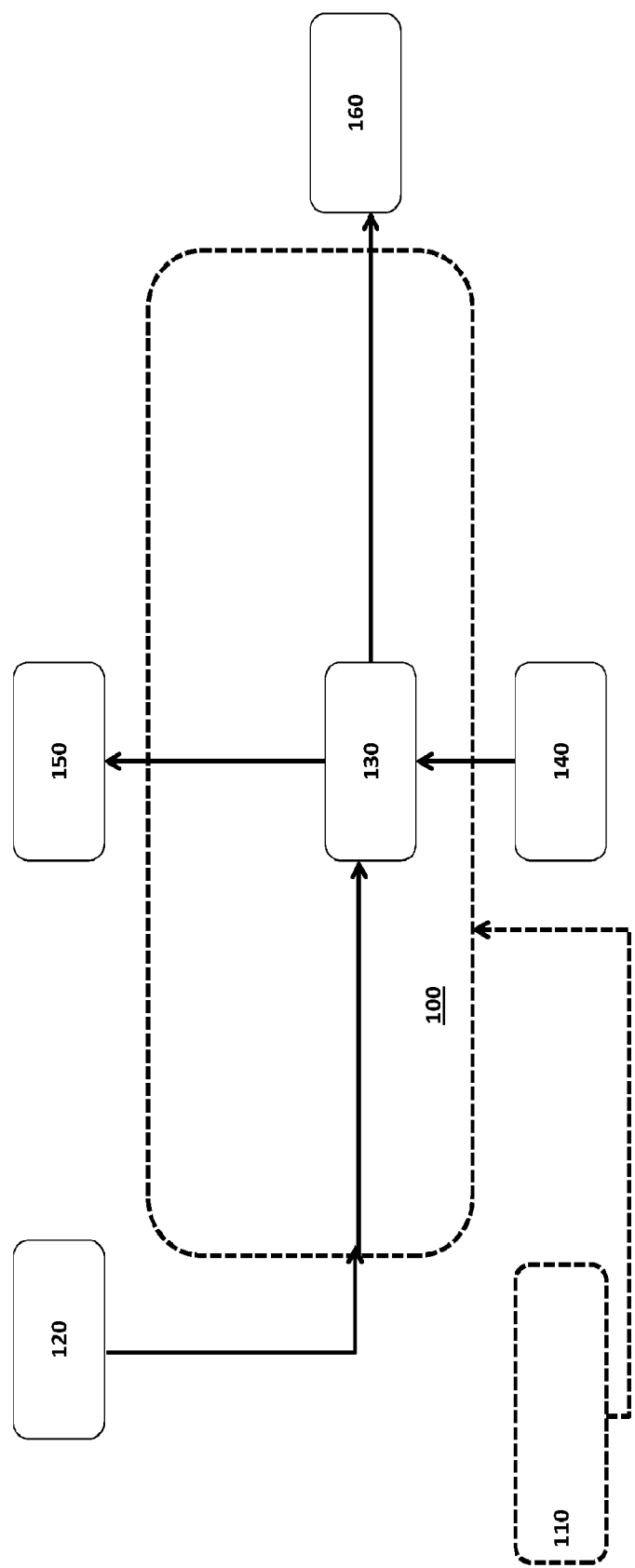
FIG. 1 provides a schematic representation of a shippable modular $CO_2$ sequestration unit that includes a $CO_2$/liquid contactor subunit.

Shippable modular units configured for use in sequestering $CO_2$ are provided. Aspects of the units may include a support, e.g., a housing or base, having associated therewith one or more of: a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are systems made up of one or more such modular units. Systems disclosed herein include large capacity systems, where individual modular units may contain only one type or more of a given subunit, e.g., a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Aspects of the invention include larger assemblages of multiple individual modular units that are engaged and may have one or many individual modular units that include a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are methods of using the units/systems in $CO_2$ sequestration protocols.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Modular $CO_2$ Sequestration Units

As summarized above, aspects of the invention include shippable modular $CO_2$ sequestration units. By $CO_2$ sequestration unit is meant a structure or device that finds use in methods of sequestering $CO_2$, i.e., $CO_2$ sequestration processes (i.e., methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ in a number of different ways, e.g., by producing a $CO_2$ sequestering product, e.g., a carbonate material, and/or by producing a substantially pure subsurface injectable $CO_2$ product gas from an amount of initial $CO_2$, such that the $CO_2$ is sequestered. The $CO_2$ sequestering product may be a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention results in prevention of $CO_2$ gas from entering the atmosphere and allows for long-term storage of $CO_2$ in a manner such that $CO_2$ does not become part of the atmosphere.

As the $CO_2$ sequestration units are modular, they are self-contained units or items that are configured for carrying out a part of or all of a given $CO_2$ sequestration process, e.g., as described in greater detail below. In some instances, the modular units are configured so to be combined or interchanged with other modular $CO_2$ sequestration units so as to produce a system configured to carry out a $CO_2$ sequestration process. In other instances, modular units are configured so to carry out a complete $CO_2$ sequestration process, in that they include all the components or units necessary to carry out a complete $CO_2$ sequestration process.

The modular $CO_2$ sequestration units are shippable. As the modular units are shippable, they are readily transportable "as is" (i.e., without breaking them down into two or more component parts), between first and second distinct geographical locations (such as a $CO_2$ sequestration location and a remote location thereto), which first and second geographical locations may be separated from each other by a distance of 100 m or more, including 500 m or more, e.g., 1 km or more, 10 km or more, 100 km or more, 1000 km or more, 10,000 km or more, including 25,000 km or more. By readily transportable is meant that the units can be conveyed between the first and second geographic locations using any convenient transportation means, such as but not limited to: boat, rail, truck, plane, etc.

The shippable modular units may have any convenient shape and dimensions. The modular units may include at least a support, e.g., skid, platform, housing, etc., for the one or more subunits that they include, i.e., that are associated therewith. In some instances, the shippable modular units have conventional shipping container dimensions, e.g., they have a length ranging from 2 to 50 m, such as 5 to 10 m; a height ranging from 2 to 30 m, such as 3 to 10 m and a width ranging from 2 to 20 m, such as 3 to 15 m. The shippable modular units are structures which are supports and may be configured in a number of different ways, e.g., as a housing or a base skid, that defines an internal volume or footprint, where one or more $CO_2$ sequestration subunits or components may be present. While the internal volume (i.e., the volume defined by the housing or volume occupied by the components on a base skid) may vary, in some instances the internal volume ranges from 8 to 30,000 $m^3$, such as 50 to 10,000 $m^3$. The mass of the shippable modular units may vary, ranging in some instances from 1 ton to 20,000 tons, such as 10 to 1000 tons and including 15 to 500 tons.

In those embodiments where the modular unit includes a housing, the housing of the container may be fabricated from any convenient material or combination of different materials, e.g., metals, metal alloys, polymeric materials, etc. The housing of the shippable modular unit includes at least one material input and at least one product output. A given housing may include a single material input, or two or more material inputs, e.g., three or more, four or more, material inputs, as desired. Similarly, a given housing may include a single product output, or two or more product outputs, e.g., three or more, four or more, product outputs, as desired. The material or product that a given input or output is configured to transfer between internal and external locations relative to the housing may vary, being solid, liquid or gas, depending on the particular modular unit and $CO_2$ sequestration subunits housed in the container. For example, a given modular unit may include a liquid input and/or a gas input. A given modular unit may include a gas output, a solid output and/or a liquid output. Different configurations of material inputs and product outputs are further described below.

In addition to the housing having one or more material inputs and one or more product outputs, the shippable modular units further include one or more $CO_2$ sequestration subunits present inside of the housing. $CO_2$ sequestration subunits are components or devices configured to perform a defined task in a $CO_2$ sequestration process. $CO_2$ sequestration subunits of interest include, but are not limited to: $CO_2$ gas/liquid contactor subunits, carbonate production subunits, alkali enrichment subunits, etc. A given modular unit may include a single $CO_2$ sequestration subunit, or two or more $CO_2$ sequestration subunits, where the two or more $CO_2$ sequestration subunits may be the same or different types of subunits. For example, a given modular unit may include one or more of the same type of $CO_2$ sequestration subunits, e.g., one or more $CO_2$ gas/liquid contactor subunits, carbonate production subunits, alkali enrichment subunits, etc. Alternatively, a given modular unit may include one or more of two or more different types of $CO_2$ sequestration subunits, e.g., one or more of at least two of $CO_2$ gas/liquid contactor subunits, carbonate production subunits, alkali enrichment subunits, etc.; including one or more of each of $CO_2$ gas/liquid contactor subunits, carbonate production subunits, alkali enrichment subunits, etc.

Depending on the configuration of a particular modular subunit, a given $CO_2$ sequestration subunit may be operably coupled directly to a material input(s) and/or product output(s) and/or operably coupled to one or more additional $CO_2$ sequestration subunits present within the housing. For example, where the $CO_2$ sequestration subunit is a $CO_2$ gas/liquid contactor subunit, the $CO_2$ gas/liquid contactor subunit may be operably coupled to a liquid material input of the modular unit and a gas (e.g., gaseous source of $CO_2$) material input of the modular unit, and also operably coupled to product outputs of the housing (e.g., one for product gas and one for $CO_2$ charged liquid), or operably coupled to a $CO_2$ product gas output and a second $CO_2$ sequestration subunit, e.g., an alkali enrichment subunit. In other instances where the $CO_2$ sequestration subunit is an alkali enrichment subunit, instead of the above described configuration, the alkali enrichment subunit may be operatively coupled to first and second liquid material inputs, as well as a liquid product output or a second $CO_2$ sequestration subunit, e.g., a $CO_2$ gas/liquid contactor subunit. Whether a given $CO_2$ sequestration subunit is operatively coupled to a material input(s) and/or product output(s) or another $CO_2$ sequestration subunit in the housing depends on a particular modular units configuration and the type(s) of $CO_2$ sequestration subunit(s) present therein.

The shippable modular units are configured to process industrial amounts materials. By "industrial amounts" is meant amounts of materials that are typically processed in an industrial setting, as opposed to a research setting. Industrial amounts are at least several fold larger than amounts of materials that are processed in a research setting. In some instances where the modular units are configured to process input liquid materials, the modular units may be configured to process 100 to 10,000,000, such as 10,000 to 1,000,000 liters/hr. In some instances where the modular units are configured to process input gaseous materials, the modular units may be configured to process 1000 to 10,000,000, such as 10,000 to 1,000,000 scfm.

As summarized above, the shippable modular units may include one or more $CO_2$ sequestration subunits, which $CO_2$ sequestration subunits may vary. Each of the subunits may be present in a subunit housing. Subunit housings may vary depending the particular subunit housed therein. A subunit housing of a subunit may be fabricated from any convenient material or combination of different materials, e.g., metals, metal alloys, polymeric materials, etc. A subunit housing of the shippable modular unit includes at least one material input and at least one product output. A given subunit housing may include a single material input, or two or more material inputs, e.g., three or more, four or more, material inputs, as desired. Similarly, a given subunit housing may include a single product output, or two or more product outputs, e.g., three or more, four or more, product outputs, as desired. Subunit housing dimensions may vary depending on the particular subunit housed therein, and in some instances subunit housings have a length ranging from 0.1 to 10 m, such as 1 to 5 m; a height ranging from 0.2 to 10 m, such as 0.25 to 15 m and a width ranging from 0.1 m to 5 m, such as 1 to 4 m. The internal volume of the subunit housings may vary, ranging in some instances from 0.2 to 100, such as 2 to 1000 $m^3$.

As summarized above, $CO_2$ sequestration subunits that may be present in the shippable modular units include, but are not limited to: $CO_2$ gas/liquid contactor subunits, carbonate production subunits, alkali enrichment subunits, water softening subunits, cation recovery subunits, heat exchange subunits, reverse osmosis subunits, nanofiltration subunits, microfiltration subunits, ultrafiltration subunits and purified $CO_2$ collection subunits. Each of these $CO_2$ sequestration subunits is now reviewed in greater detail.

$CO_2$ Gas/Liquid Contactor Subunit

One type of $CO_2$ sequestration subunit that may be present in a shippable module is a $CO_2$ gas/liquid contactor subunit. $CO_2$ gas/liquid contactor subunits are devices or components that are configured to contact a $CO_2$ containing gas with a liquid (e.g., an aqueous medium) under conditions sufficient to remove $CO_2$ from the $CO_2$ containing gas (e.g., a $CO_2$ containing gaseous stream), and increase the dissolved inorganic carbon (including bicarbonate ion) concentration of liquid (an in some instances produce an LCP containing liquid, as described in greater detail below). The $CO_2$ containing gas may be contacted with the liquid in the subunit using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, packed column reactors, aqueous froth filters (e.g., as described in U.S. Pat. Nos. 7,854,791; 6,872,240; 6,616,733, as well as Published U.S. Patent Application Nos. 20140245887 and WO2005/014144; the disclosures of which are herein incorporated by reference); and the like, as may be convenient.

In some instances, the contactor subunit is configured so that the gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725; 6,872,240 and 5,695,545; the disclosures of which are herein incorporated by reference. In some instances, the microporous hollow fiber membrane contactor that is employed is a Liqui-Cel® hollow fiber membrane contactor (available from Membrana, Charlotte N.C.), which membrane contactors include polypropylene membrane contactors and polyolefin membrane contactors.

$CO_2$ gas/liquid contactor subunits are further described in U.S. patent application Ser. No. 14/636,043; the disclosure of which is herein incorporated by reference.

Carbonate Production Subunit

One type of $CO_2$ sequestration subunit that may be present in a shippable module is a carbonate production subunit (i.e., a mineralization subunit). Carbonate production subunits are devices or components that are configured to manipulate a bicarbonate-containing liquid, such as a liquid condensed phase (i.e., LCP) containing liquid (e.g., LCP) to produce solid phase carbonate composition, and therefore sequester $CO_2$ from an initial CO2-containing gas into a solid form and produce a $CO_2$ sequestering carbonate material. By $CO_2$ sequestering carbonate material is meant a material that stores a significant amount of $CO_2$ in a storage-stable format, such that $CO_2$ gas is not readily produced from the material and released into the atmosphere. In certain embodiments, the $CO_2$-sequestering material includes 5% or more, such as 10% or more, including 25% or more, for instance 50% or more, such as 75% or more, including 90% or more of $CO_2$, e.g., present as one or more carbonate compounds. The $CO_2$-sequestering materials produced in accordance with methods of the invention may include one or more carbonate compounds, e.g., as described in greater detail below. The amount of carbonate in the $CO_2$-sequestering material, e.g., as determined by coulometry, may be 40% or higher, such as 70% or higher, including 80% or higher.

$CO_2$ sequestering materials, e.g., as described herein, provide for long-term storage of $CO_2$ in a manner such that $CO_2$ is sequestered (i.e., fixed) in the material, where the sequestered $CO_2$ does not become part of the atmosphere. When the material is maintained under conditions conventional for its intended use, the material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the material. With respect to the $CO_2$-sequestering materials, when they are employed in a manner consistent with their intended use and over their lifetime, the amount of degradation, if any, as measured in terms of $CO_2$ gas release from the product will not exceed 10% per year, such as 5% per year, and in certain embodiments, 1% per year. In some instances, $CO_2$-sequestering materials provided by the invention do not release more than 1%, 5%, or 10% of their total $CO_2$ when exposed to normal conditions of temperature and moisture, including rainfall of normal pH, for there intended use, for at least 1, 2, 5, 10, or 20 years, or for more than 20 years, for example, for more than 100 years. Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, or more than 1000 years).

In certain instances, the carbonate production subunit is configured to combine a bicarbonate-containing liquid or component thereof (e.g., LCP) with a divalent cation source (e.g., a hard water) under conditions sufficient to produce the desired carbonate product. Any convenient divalent cation source may be employed. Divalent cations, such as alkaline earth metal cations, e.g., calcium and magnesium cations, are of interest. Cation sources of interest include, but are not limited to, the brine from water processing facilities, such as sea water desalination plants, brackish water desalination plants, groundwater recovery facilities, wastewater facilities, and the like, which produce a concentrated stream of solution high in cation contents. Also of interest as cation sources are naturally occurring sources, such as, but not limited to, native seawater and geological brines, which may have varying cation concentrations and may also provide a ready source of cations to trigger the production of carbonate solids from a bicarbonate rich product or component thereof (e.g., LCP), such as described in greater detail below. In such embodiments, the carbonate production unit may be operably connected to a material input for a divalent cation source. A given divalent cation source may be a solid or liquid, as desired. For example, a liquid divalent cation source may be employed. Alternatively, a solid divalent cation source, such as a particulate source (e.g., a powder) may be employed.

In some embodiments, the carbonate production subunit is configured such that, during the production of solid carbonate compositions from the bicarbonate-containing solution (e.g., an LCP containing liquid), one mol of $CO_2$ may be produced for every 2 mols of bicarbonate ion from the bicarbonate-containing solution or component thereof (e.g., LCP). For example, where solid carbonate compositions are produced by adding calcium cation to the bicarbonate-containing solution or component thereof (e.g., LCP), the production of solid carbonate compositions, e.g., the form of amorphous calcium carbonate minerals, may proceed according to the following reaction:

$$2HCO_3^- + Ca^{++} \leftrightarrow CaCO_3 \cdot H_2O + CO_2$$

$$Ca^{++}_{(aq)} + 2HCO_{3(aq)}^- \leftrightarrow H\ CaCO_{3(s)} + H_2O_{(l)} + CO_{2(g)}$$

While the above reaction shows the production of 1 mol of $CO_2$, 2 moles of $CO_2$ from the $CO_2$-containing gas were initially converted to bicarbonate. As such, the overall process sequesters a net 1 mol of $CO_2$ and therefore is an effective $CO_2$ sequestration process, with a downhill thermodynamic energy profile of $-34$ kJ mol$^{-1}$ for the above reaction.

Where carbonate compositions are produced, e.g., as described above, from the $CO_2$ sequestration protocol, the product carbonate compositions may vary greatly. The carbonate product may include one or more different carbonate compounds, such as two or more different carbonate compounds, e.g., three or more different carbonate compounds, five or more different carbonate compounds, etc., including non-distinct, amorphous carbonate compounds. Carbonate compounds may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCO_3$). Calcium magnesium carbonate minerals of interest include, but are not limited to dolomite ($CaMg(CO_3)_2$), huntite ($Mg_3Ca(CO_3)_4$) and sergeevite ($Ca_2Mg_{11}(CO_3)_{13} \cdot H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the product ranges from 1.5-5 to 1, such as 2-4 to 1 including 2-3 to 1. In some instances, the product may include hydroxides, such as divalent metal ion hydroxides, e.g., calcium and/or magnesium hydroxides.

In some instances, the carbonate production subunit is configured to produce solid carbonate products using a precipitation protocol, e.g., a protocol which results in the production of a slurry that includes precipitated carbonate products. Precipitation of solid carbonate compositions from a dissolved inorganic carbon (DIC) composition (e.g., an LCP composition as employed in a bicarbonate-mediated sequestration protocol), such as described above, results in the production of a composition that includes both precipitated solid carbonate compositions, as well as the remaining liquid from which the precipitated product was produced (i.e., the mother liquor). This product composition may be present as a slurry of the precipitate and mother liquor.

In some instances, the carbonate production subunit is configured to produce solid carbonate products using a non-slurry continuous protocols for production of $CO_2$ sequestering materials. As the processes of these embodiments are continuous, they are not batch processes. In practicing continuous processes of the invention, a divalent cation source, e.g., as described above, is introduced into a flowing aqueous bicarbonate and/or carbonate containing liquid (e.g., a bicarbonate rich product containing liquid as described above) under conditions sufficient such that a non-slurry solid phase $CO_2$ sequestering carbonate material is produced in the flowing aqueous bicarbonate rich product. The carbonate production unit of these embodiments may be configured as a continuous reactor. Where the production subunit is a continuous reactor, the location at which the $CO_2$ sequestering material is produced may be a fluidized bed subunit of the continuous reactor. Fluidized bed reactors of interest are configured to maintain a region of fluidized solids in a continuously flowing medium, and may have a fluid inlet, a fluid outlet, and a region of material production positioned there-between. A given fluidized bed reactor may have a single change or multiple chambers, as desired. Where desired, the fluidized bed may include structures, e.g., filters, meshes, frits, etc., or other retaining structures which serve to keep the product material in the fluidize bed.

Carbonate production subunits are further described in U.S. patent application Ser. No. 14/636,043; the disclosure of which is herein incorporated by reference.

Alkali Enrichment Subunit

One type of $CO_2$ sequestration subunit that may be present in a shippable module is an alkali enrichment subunit. Alkali enrichment (AE) subunits are devices or components that are configured to increase the alkalinity of a liquid, e.g., to produce a $CO_2$ capture liquid, to enhance the alkalinity of a $CO_2$ charged liquid, etc. The alkalinity increase of a given liquid may be manifested in a variety of different ways. In some instances, increasing the alkalinity of a liquid is manifested as an increase the pH of the liquid. For example, a liquid may be processed to remove hydrogen ions from the liquid to increase the alkalinity of the liquid. In such instances, the pH of the liquid may be increased by a desirable value, such as 0.10 or more, 0.20 or more, 0.25 or more, 0.50 or more, 0.75 or more, 1.0 or more, 2.0 or more, etc. In some instances, the magnitude of the increase in pH may vary, ranging in some instances from 0.1 to 10, such as 1 to 9, including 2.5 to 7.5, e.g., 3 to 7. As such, methods may increase the alkalinity of an initial liquid to produce a product liquid having a desired pH, where in some instances the pH of the product liquid ranges from 5 to 14, such as 6 to 13, including 7 to 12, e.g., 8 to 11, where the product liquid may be viewed as an enhanced alkalinity liquid. The increase in alkalinity of a liquid may also be manifested as an increase in the dissolved inorganic carbon (DIC) content of liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2-}]$ is the carbonate concentration in the solution. The DIC of the alkali enriched liquid may vary, and in some instances may be 500 ppm or greater, such as 5,000 ppm or greater, including 15,000 ppm or greater. In some instances, the DIC of the alkali enriched liquid may range from 500 to 20,000 ppm, such as 7,500 to 15,000 ppm, including 8,000 to 12,000 ppm. In some instances, alkali enrichment is manifested as an increase in the concentration of bicarbonate species, e.g., $NaHCO_3$, e.g., to a concentration ranging from 5 to 500 mMolar, such as 10 to 200 mMolar.

In some instances, the alkali enrichment subunit includes a membrane, such that it is configured for use in a membrane mediated alkali enrichment protocol. By membrane mediated protocol is meant a process or method which employs a membrane at some time during the method. As such, membrane mediated alkali enrichment protocols are those alkali enrichment processes in which a membrane is employed at some time during the process. While a given membrane mediated alkali enrichment protocol may vary, in some instances the membrane mediated protocol includes contacting a first liquid, e.g., a feed liquid, and a second liquid, e.g., a draw liquid, to opposite sides of a membrane. A variety of different types of membranes, membrane configurations, contact protocols, first and second liquid pairings, etc., may be employed, where selection of a particular set of protocol parameters may depend on a number of different factors, such as the nature of the first and second liquids that are available, for what purpose the alkali enrichment protocol is employed (e.g., to produce a $CO_2$ capture liquid, to increase the alkalinity of a $CO_2$ charged liquid, etc.). A variety of different types of membranes may be employed in a given alkali enrichment protocol. In some embodiments, a selective membrane may utilize dialysis diffusion through the membrane to selectively partition ions between the feed and the draw stream. Diffusion dialysis membranes are generally permeable to hydrogen ions and utilize differences in ion solubility and mobility within the membrane for selective ion separations between different liquids, e.g., feed and draw liquids. Examples of such membranes include, but are not limited to those described in: Liu et al., J. Membrane Science (2014) 451: 18-23; Hao et al., J. Membrane Science (2013) 425-426: 156-162; Gu et al., Desalination (2012) 304: 25-32; and Hao et al., J. Hazardous Materials (2013) 244-245: 348-356; as well as Nafion membranes, e.g., as described in Okada et al., Electrochimica Acta (1998) 43: 3741-3747. In some instances, the diffusion dialysis membrane employed is ion or charge selective membrane, i.e., a membrane that preferentially allows the passage of one type of charged species across the membrane relative to other species, e.g., other charged species and/or neutral species. For example, membranes of interest include cationic membranes, i.e., membranes that permit the passage of cations but not of anions. Any cationic membrane may be employed in cationic membrane mediated alkali enrichment protocols. Cationic membranes of interest include, but are not limited to: Selemion™ cation exchange membranes CMV, CMD, HSF, CSO, CMF, and the like. Also of interest are anionic membranes, i.e., membranes that permit the passage of cations but not of anions. Anionic membranes of interest include, but are not limited to: Selemion™ anion exchange membranes AMV, AMT, DSV, AAV, ASV, AHO, APS4, and the like. Membranes employed in membrane mediated alkali enrichment protocols may vary with respect to porosity. In some embodiments, employed membranes may be size-based separators that allow molecules under a certain size to pass through, while preventing larger molecules from passing through. In this way, the membranes can be used to selectively retain molecules that are over a certain size while allowing other molecules that are below a certain size to pass through.

A given membrane may have a variety of different physical dimensions. In some instances, membranes of interest having thicknesses ranging from 0.001 mm to 1 mm, such as 0.005 mm to 0.05 mm and including 0.03 mm to 0.3 mm. Membranes in accordance with embodiments of the invention can have a variety of configurations including thin films, hollow fiber membranes, spiral wound membranes, monofilaments and disk tubes. Membranes of interest can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$. The material selected for use as the membrane may be selected to be able to withstand various process conditions to which the membrane may be subjected. For example, it may be desirable that the membrane be able to withstand elevated temperatures, such as those associated with sterilization or other high temperature processes. In some embodiments, a membrane module may be operated at a temperature in the range of 0 to 100° C., such as 40 to 50° C. Likewise, the membrane may be selected to be able to maintain integrity under various pH conditions, such as a pH level ranging from 2 to 11, such as 7 to 10. The thickness of the membrane may vary, ranging in some instances from 0.01 mm to 0.1 mm, such as 0.02 mm to 0.06 mm and including 0.03 mm to 0.04 mm.

Membranes employed in methods of the invention may be present in distinct alkali enrichment units, which units are configured produce a desired amount of alkalinity per time. For example, alkali enrichment units may be configured to produce 0.1 to 10 moles of alkalinity per square meter of membrane per hour (mol alkalinity/$m^2$ h), such as 0.5 to 1.5 mol alkalinity/$m^2$ h. A given unit may include one or more square meter ($m^2$) of membrane, such as two or more $m^2$ membrane, e.g., 5 $m^2$ to 500,000 $m^2$ membrane, such as 40 $m^2$ to 400 $m^2$ membrane, including 50,000 $m^2$ to 250,000 $m^2$ membrane, which may be arranged so that the first and second fluids flow sequentially past each of the membranes, e.g., in a co- or counter-current fashion. In such units, the one or $m^2$ membrane may be positioned within a housing or casing, e.g., in a plate-and-frame structure or "stack". The housing may be sized and shaped to accommodate the membrane(s) positioned therein. For example, the housing may be substantially cylindrical if housing spirally wound forward osmosis membranes. Alternatively, the housing may have a box configuration, e.g., where multiple membranes are arranged therein in a stacked or plate-and-frame structure. The housing of the membrane module may contain inlets to provide first and second liquids to the membrane module as well as outlets for withdrawal of product streams from the membrane module. In some embodiments, the housing may provide at least one reservoir or chamber for holding or storing a fluid to be introduced to or withdrawn from the membrane module. In some embodiments, the housing may be insulated.

Alkali enrichment subunits are further described in U.S. patent application Ser. No. 14/636,043; the disclosure of which is herein incorporated by reference.

Water Softening Subunit

One type of $CO_2$ sequestration subunit that may be present in a shippable module is a water softening subunit. Water softening subunits are units that are configured to soften an aqueous medium, e.g., by removing divalent cations, such as calcium and magnesium ions, from an aqueous medium. In other words, an initial aqueous medium may be subject to a hardness reduction protocol prior to being subjected to a hydronium ion removal protocol, e.g., as described above. Hardness reduction protocols of interest include removing divalent cations, e.g., alkaline earth metal divalent cations, from an initial aqueous medium. Water softening subunits reduce the hardness of a given aqueous medium by a suitable amount, where in some instances the hardness is reduce to a level that does not result in any substantial scaling in a $CO_2$ gas/liquid contactor subunit. While the amount of hardness reduction may vary, in some instances the amount of of hardness reduction is 5% or greater, such as 25% or greater, including 50% or greater.

In the water softening subunits, divalents cations may be removed from an aqueous medium using any convenient protocol. In some instances, an aqueous medium input is contacted with a divalent cation selective membrane under conditions sufficient to separate the liquid component of the feed and smaller molecules having a diameter that is less than that of a hydrated divalent cation from a retentate. Processing conditions may include a range of positive or negative pressures applied to the membrane. Where desired, positive or negative pressures may be applied to the membrane such that a pressure differential is established across the membrane. For example, in some embodiments, a membrane feed is contacted with a divalent cation selective membrane such that a pressure differential across the membrane ranges from 1 atmosphere (ATM) up to 50 ATM, such as 20-30 ATM is established. In some embodiments, processing conditions may include a range of suitable temperatures. For example, in some embodiments, a membrane feed is contacted with a divalent cation selective membrane at a temperature ranging from 0° C. up to 100° C., such as 40-50° C. Likewise, a membrane may be selected to be able to maintain integrity under various pH conditions, such as a pH ranging from 2 to 11, such as 7 to 10. Contacting the aqueous medium with the divalent cation selective membrane results in the formation of a permeate having a reduced concentration of divalent cations relative to the feed, and a retentate having an increased concentration of divalent cations relative to the feed. Aspects of the methods involve subjecting the reduced divalent cation concentration permeate to the hydrogen ion removal process described above. Aspects of the methods also involve subjecting the increased divalent cation concentration retentate to further processing, as described below.

In some embodiments, the divalent cation selective membrane is a nanofiltration membrane. In these instances, the water softening subunit may be viewed as a nanofiltration subunit. By "nanofiltration membrane" is meant a membrane whose pores range in diameter from 0.1 to 20 nanometers, such as 0.5 to 10 nanometers, including 1 to 10 nanometers, such as 1 to 2 nanometers, and are configured to retain divalent cations, such as $Mg^{2+}$ and $Ca^{2+}$ cations, in the retentate, while allowing smaller species to pass through the membrane with the permeate. For example, in certain embodiments, a nanofiltration membrane is adapted to retain hydrated divalent cations (e.g., $Ca^{2+}$, $Mg^{2+}$) on a first side of the membrane, while allowing smaller hydrated monovalent ions to pass to the other side of the membrane. In some embodiments, a nanofiltration membrane is configured such that in use, the nanofiltration membrane can retain divalent cations in the retentate without adding additional ions, such as sodium ions, to the feed. In some embodiments, a nanofiltration membrane is configured such that in use, the nanofiltration membrane can retain divalent cations in the retentate without the need to continuously heat or cool the solution. Nanofiltration membranes in accordance with embodiments of the invention may have varying pore density, and in some instances have a pore density ranging from 1 to 150 pores per square centimeter, such as 50 to 100 pores per square centimeter. The pore dimensions and pore density may be controlled using suitable process conditions, such as controlled pH, temperature and process timing employed during a nanofiltration membrane fabrication process. The material from which a nanofiltration membrane is made may be selected to be able to withstand various process conditions to which the membrane may be subjected during processing. For example, it may be desirable that the membrane be able to withstand elevated temperatures, such as those associated with sterilization or other high temperature processes, as well as elevated pressures. In some embodiments, a nanofiltration membrane has a standardized design, such as, e.g., a spiral wound module design or a tubular module design, having a range of standard diameters to fit standard pressure vessel sizes and/or components thereof. In certain embodiments, a standardized nanofiltration membrane module is configured to facilitate the connection of multiple membrane modules in series and/or in parallel within a standardized pressure vessel. In some embodiments, a nanofiltration membrane may be in the form of a cartridge that is positioned within a housing or casing. The housing may be sized and shaped to accommodate the membrane(s) positioned therein. For example, the housing may be substantially cylindrical if housing a spirally wound membrane. The housing of the module may contain inlets or channels to facilitate the introduction of a membrane feed into the module, as well as outlets for withdrawal of product streams from the module. In some embodiments, the housing may provide at least one reservoir or chamber for holding or storing a fluid to be introduced into or withdrawn from the module. In some embodiments, the housing may be insulated.

Protocols for softening an aqueous medium are further described in U.S. Provisional Application Ser. No. 62/051,100 filed on Sep. 16, 2014; the disclosure of which is herein incorporated by reference. While a given water softening subunit may be positioned at any convenient location in a modular unit or system of modular units, in some instances it is positioned upstream of a $CO_2$ gas/liquid contactor subunit.

Cation Recovery Subunit

One type of $CO_2$ sequestration subunit that may be present in a shippable module is a cation recovery subunit. Cation recovery subunits are subunits configured to recover a cation rich composition for use in another subunit system of a module/system that includes the cation recovery subunit. The cation recover subunit may be a simple conveyor the takes the cation rich retentate from a water softening subunit and transfers it to another subunit, such as a carbonate production subunit.

In some instances, cation recovery subunit is a subunit that is configured to produce a concentrated hard water, where the concentrated hard water is one that has been produced by contacting an initial hard water with a divalent cation selective membrane to produce a concentrated hard water that has an increased concentration of divalent cations as compared to the initial hard water. Divalent cation selective membranes that may be used in such embodiments are configured or adapted to prevent the passage of divalent cations from one side of the membrane to the other, while allowing liquid and smaller molecules (e.g., molecules having a diameter that is smaller than the diameter of a hydrated divalent cation) to pass from one side of the membrane to the other. Divalent cation selective membranes in accordance with embodiments of the invention have pores or passages of a size that allows liquid and smaller molecules to pass through, but prevents or blocks the passage of particles having a size equal to or greater than the diameter of a hydrated divalent cation, such as $Ca^{2+}$ or $Mg^{2+}$. A membrane "feed" refers to an initial liquid mixture that is applied to a membrane filter. A membrane "retentate" or "concentrate" refers to the components of the feed that cannot pass through the pores or passages of the membrane and are thus retained on the first side of the membrane. A membrane "permeate" refers to the components of the feed that are able to pass through the pores or passages of the membrane to reach the other side of the membrane. In some embodiments of the methods, a membrane feed is contacted with a divalent cation selective membrane under conditions that are sufficient to separate the liquid component of the feed and smaller molecules having a diameter that is less than that of a hydrated divalent cation from the retentate. Processing conditions may include a range of positive or negative pressures applied to the membrane. Where desired, positive or negative pressure may be applied to the membrane such that a pressure differential is established across the membrane. For example, in some embodiments, a membrane feed is contacted with a divalent cation selective membrane such that a pressure differential across the membrane ranges from 1 atmosphere (atm) up to 40 atm, such as 20-30 atm is established. In some embodiments, processing conditions may include a range of suitable temperatures. For example, in some embodiments, a membrane feed is contacted with a divalent cation selective membrane at a temperature ranging from 0° C. up to 100° C., such as 40-50° C. Likewise, a membrane may be selected to be able to maintain integrity under various pH conditions, such as a pH ranging from 2 to 11, such as 7 to 10. In some embodiments, the selective membrane is a nanofiltration membrane, e.g., as described above.

As used herein, the term "concentrated hard water" means a solution of aqueous media having a divalent cation concentration of 500 ppm or greater, such as 600 ppm or greater, including 750 ppm or greater. In some instances, a concentrated hard water has a divalent cation concentration of 2,500 ppm or greater, e.g., 5,000 ppm or greater, 10,000 ppm or greater, 15,000 ppm or greater, 20,000 ppm or greater, 25,000 ppm or greater, 30,000 ppm or greater, 40,000 ppm or greater, including 50,000 ppm or greater. In some embodiments, a concentrated hard water may have a divalent cation concentration ranging from 500 to 200,000 ppm, such as 1,000 to 200,000 ppm, where in some instances the concentration ranges from 50,000 to 200,000 ppm, such as 50,000 to 175,000 ppm, an including 50,000 to 150,000 ppm. While the concentrated hard water may vary depending on the particular application, concentrated hard waters of interest include one or more solutes, e.g., divalent cations, such as alkaline earth metal cations, including but not limited to $Mg^{2+}$, $Ca^{2+}$, $Be^{2+}$, $Ba^{2+}$, $Sr^{2+}$, $Pb^{2+}$, $Fe^{2+}$, and $Hg^{2+}$. The pH of concentrated hard waters in accordance with embodiments of the invention may vary, and in some instances ranges from 2 to 12, such as 4 to 10. In such embodiments, an initial hard water may be naturally occurring or man-made, as desired. Naturally occurring hard waters include, but are not limited to, waters obtained from seas, oceans, lakes, swamps, estuaries, lagoons, brines, alkaline lakes, inland seas, etc. In certain embodiments, a naturally occurring hard water source is co-located with a location where a $CO_2$ sequestration protocol or process is conducted. Man-made sources of hard waters may also vary, and may include brines produced by water desalination plants, mining operations, such as fracking operations, oil field operations, industrial waste waters, and the like. Of interest in some instances are waters that provide for excess alkalinity, which is defined as alkalinity which is provided by sources other than bicarbonate ion. In these instances, the amount of excess alkalinity may vary, so long as it is sufficient to provide 1.0 or slightly less, e.g., 0.9, equivalents of alkalinity. Hard waters of interest include those that provide excess alkalinity (meq/liter) of 30 or higher, such as 40 or higher, 50 or higher, 60 or higher, 70 or higher, 80 or higher, 90 or higher, 100 or higher, etc. In certain embodiments, where such hard waters are employed, no other source of alkalinity, e.g., NaOH, is required. Where desired, methods of such embodiments may include combining a scaling-retarding amount of an acidic solution with the concentrated hard water. Acidic solutions in accordance with embodiments of the invention may be, e.g., aqueous solutions having a pH ranging from 1 to 7, such as from 3 to 5. In certain embodiments, an acidic solution may be an acidic by-product of alkali enrichment protocol, e.g., as described above.

In some instances, the cation recovery subunit is a concentrated hard water production unit that producing a concentrated hard water using a membrane mediated protocol, e.g., as described in U.S. Patent Application Ser. No. 62/041,568 filed on Aug. 25, 2014; the disclosure of which is herein incorporated by reference).

Heat Exchange Subunit

One type of $CO_2$ sequestration subunit that may be present in a shippable module is a heat exchange subunit. Heat exchange subunits of interest are subunits that are configured to remove heat from a first medium, e.g., liquid or gas, and in some instances transfer the removed heat to a second medium, e.g., liquid or gas, where the second medium is in subunit distinct from the subunit where the medium is located from which the heat is removed. In some instances, the heat exchange subunit is a subunit configured to remove heat from an input gas, e.g., flue gas, and either discard the heat, e.g., by directing it to an output vent, or transfer the heat to another subunit, e.g., a carbonate production subunit.

The heat exchange subunit may vary. In some instances, the heat exchange subunit is a gas/liquid heat exchange device. In certain embodiments, heat exchange subunit may include one or more channels (e.g., channels having a large interior and/or exterior surface area) physically integrated with a conduit for a gas, e.g., flue gas. Where desired, heat exchange elements are configured such that water may flow through them and thereby transfer heat away from the gas and into the water. Examples of heat exchange elements that may be utilized either wholly or partially in connection with the disclosed systems are provided by U.S. Pat. Nos. 6,374,627; 8,009,430; 7,525,207; 7,347,058; 8,004,832; 7,810,341; 7,808,780; 6,574,104; 6,859,366; 8,157,626; 7,881,057; 6,980,433; 6,945,058; 6,854,284; 6,834,512; 6,775,997; 6,772,604; 8,113,010; 8,276,397; the disclosures of each which are incorporated by reference herein.

Reverse Osmosis Subunit

One type of $CO_2$ sequestration subunit that may be present in a shippable module is a reverse osmosis subunit. By reverse osmosis subunit is meant a subunit that is configured to separate small solutes, e.g., sodium ions, chloride ions, etc., from an aqueous medium. Microfiltration subunits of interest may include a reverse osmosis membrane. Reverse osmosis membranes have a porosity that may vary, where in some embodiments, the reverse osmosis membrane has pores ranging in size from 5 Angstroms up to 6 Angstroms, up to 7 Angstroms, up to 8 Angstroms. Configuration of the membrane may vary, where configurations of interest include plate and frame (i.e., flat sheet) and spiral-wound. While a reverse osmosis subunit may be present in any convenient location of a module/system, in some instances it is present at a position downstream of a liquid output of another subunit, e.g., so as remove salt from a liquid output and produce a water suitable for further use in the system.

Nanofiltration Subunit

One type of $CO_2$ sequestration subunit that may be present in a shippable module is a nanofiltration subunit. In these instances, the nanofiltration subunit may be separate or distinct from a water softening subunit, such that a given module/system may have both a water softening subunit and a nanofiltration subunit. Nanofiltration subunits of interest may include a nanofiltration membrane, e.g., as described above in connection with the water softening subunit. While a nanofiltration subunit may be present in any convenient location of a module/system, in some instances it is present at a position downstream of a liquid output of another subunit, e.g., so as remove divalent cations from a liquid output and produce a water suitable for further use in the system.

Microfiltration Subunit

One type of $CO_2$ sequestration subunit that may be present in a shippable module is a microfiltration subunit. By microfiltration subunit is meant a subunit that is configured to separate particles, such as, sediment, algae, protozoa or large bacteria, etc., from an aqueous medium. Microfiltration subunits of interest may include a microfiltration membrane. Microfiltration membranes have a porosity ranging from 0.1 to 1 μm and may be fabricated from a variety of different materials, including but not limited to: polymers, e.g., cellulose acetate (CA), polysulfone, polyvinylidene fluoride, polyethersulfone and polyamide (as may be found in organic membranes; and sintered metal or porous alumina (as may be found in inorganic membranes. Configurations of membranes may vary, where configurations of interest include plate and frame (i.e., flat sheet) and spiral-wound. While a microfiltration subunit may be present in any convenient location of a module/system, in some instances it is present at a position upstream of a liquid input of another subunit, e.g., so as remove larger contaminants from a liquid before the liquid enters the subunit.

Ultrafiltration Subunit

One type of $CO_2$ sequestration subunit that may be present in a shippable module is an ultrafiltration subunit. Ultrafiltration subunits of interest may include a ultrafiltration membrane. Ultrafiltration membranes have a porosity ranging 10 nanometers up to 20 nanometers, up to 30 nanometers, up to 40 nanometers, up to 50 nanometers, up to 60 nanometers, up to 70 nanometers, up to 80 nanometers, up to 90 nanometers, up to 100 nanometers, up to 125 nanometers, up to 150 nanometers, up to 175 nanometers, up to 200 nanometers, or more, and may be fabricated from a variety of different materials, including but not limited to: polymers, e.g., (polysulfone, polypropylene, cellulose acetate, PLA); and ceramics. Configurations of membranes may vary, where configurations of interest include plate and frame (i.e., flat sheet) and spiral-wound. While a ultrafiltration subunit may be present in any convenient location of a module/system, in some instances it is present at a position upstream of a liquid input of another subunit, e.g., so as remove larger contaminants from a liquid before the liquid enters the subunit.

Purified $CO_2$ Collection Subunit

One type of $CO_2$ sequestration subunit that may be present in a shippable module is purified $CO_2$ collection subunit. By purified $CO_2$ collection subunit is meant a subunit that is configured collect, and in some instances store, purified $CO_2$ gas produced by another subunit of the system, e.g., a carbonate production subunit. Where desired, the purified $CO_2$ collection subunit may be configured to compress the gas, e.g., for storage or further processing, including transport to another location.

Specific Embodiments

The shippable modular $CO_2$ sequestration units having been generally described, various specific illustrative shippable modular $CO_2$ sequestration units are now reviewed in greater detail. FIG. 1 provides a schematic view of a shippable modular $CO_2$ sequestration unit that includes a single $CO_2$ gas/liquid contactor subunit. As shown in FIG. 1, shippable modular $CO_2$ sequestration unit 100 includes a housing 110 sized to be shippable, e.g., as described above. Housing 110 includes a liquid material input 120, e.g., introducing a liquid material (such as an aqueous medium) into the interior of the housing. Operatively coupled to the liquid material input 120 is $CO_2$ gas/liquid contactor subunit 130. $CO_2$ gas/liquid contactor subunit 130 is also operatively coupled to gas material input 140 which is configured for receiving a gaseous material (such as a $CO_2$ containing gaseous material) into the interior of the housing. $CO_2$ gas/liquid contactor subunit 130 is operatively coupled to gaseous product output 150 which is configured to pass treated gas from the contactor subunit to the outside of the unit. $CO_2$ gas/liquid contactor subunit 130 is operatively coupled to liquid product output 160 which is configured to pass $CO_2$ charged liquid from the contactor subunit to the outside of the unit. While only a single contactor subunit is illustrated in the embodiment shown in FIG. 1, as described above, a given unit may include 2 or more, such as 3 or more, including 4 or more contactor subunits, as desired.

Figure 2:
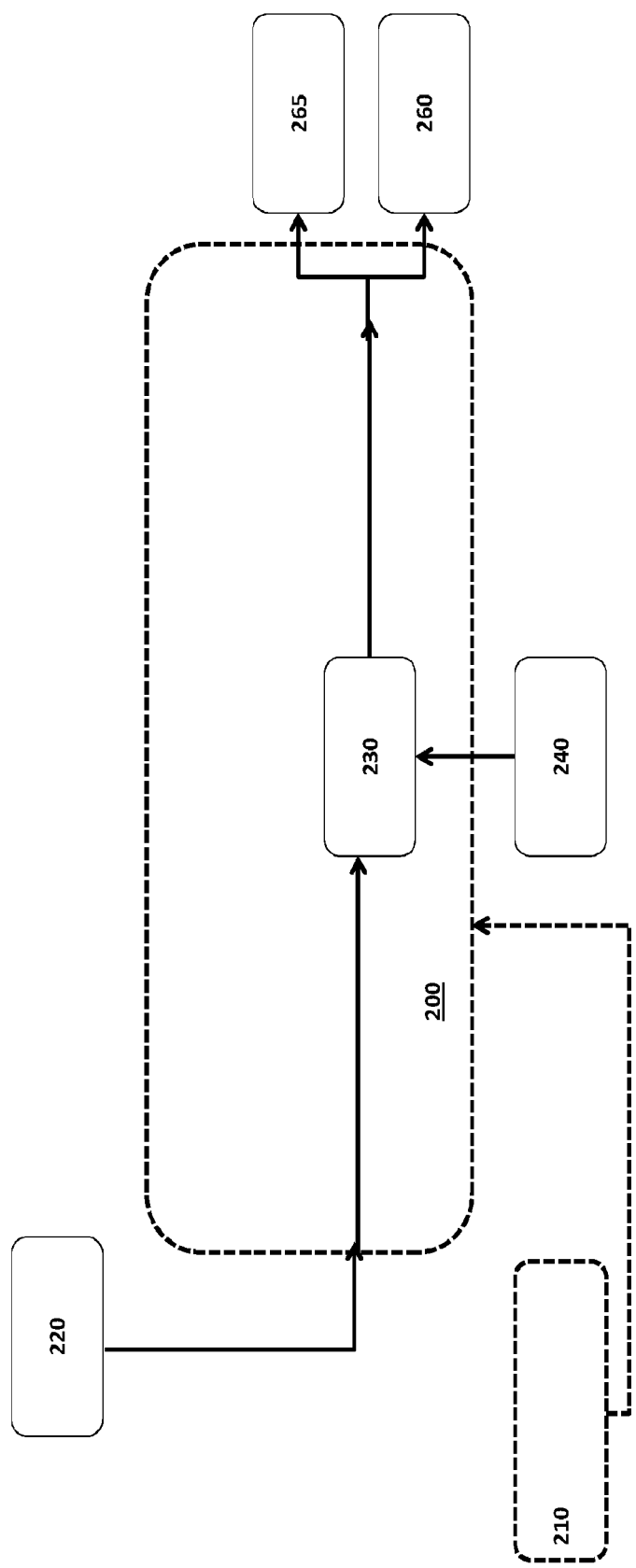
FIG. 2 provides a schematic representation of a shippable modular $CO_2$ sequestration unit that includes a carbonate production subunit.

FIG. 2 provides a schematic view of a shippable modular $CO_2$ sequestration unit that includes a single carbonate production subunit. As shown in FIG. 2, shippable modular $CO_2$ sequestration unit 200 includes a housing 210 sized to be shippable, e.g., as described above. Housing 210 includes a liquid material input 220, e.g., introducing a liquid material (such as a bicarbonate containing, e.g., LCP containing, liquid) into the interior of the housing. Operatively coupled to the liquid material input 220 is carbonate production subunit 230. Carbonate production subunit 230 is also operatively coupled to divalent cation source input 240 which is configured for receiving a divalent cation source (such as a concentrated brine) into the interior of the housing. Carbonate production subunit 230 is operatively coupled to carbonate product output 260 which is configured to pass the carbonate product (e.g., slurry of precipitated carbonate solids) to the outside of the unit. Carbonate production subunit 230 is also operatively coupled to gaseous product output 265 which is configured to pass the pure $CO_2$ gas product to the outside of the unit. While only a single carbonate production subunit is illustrated in the embodiment shown in FIG. 2, as described above, a given unit may include 2 or more, such as 3 or more, including 4 or more carbonate production subunits, as desired.

Figure 3:
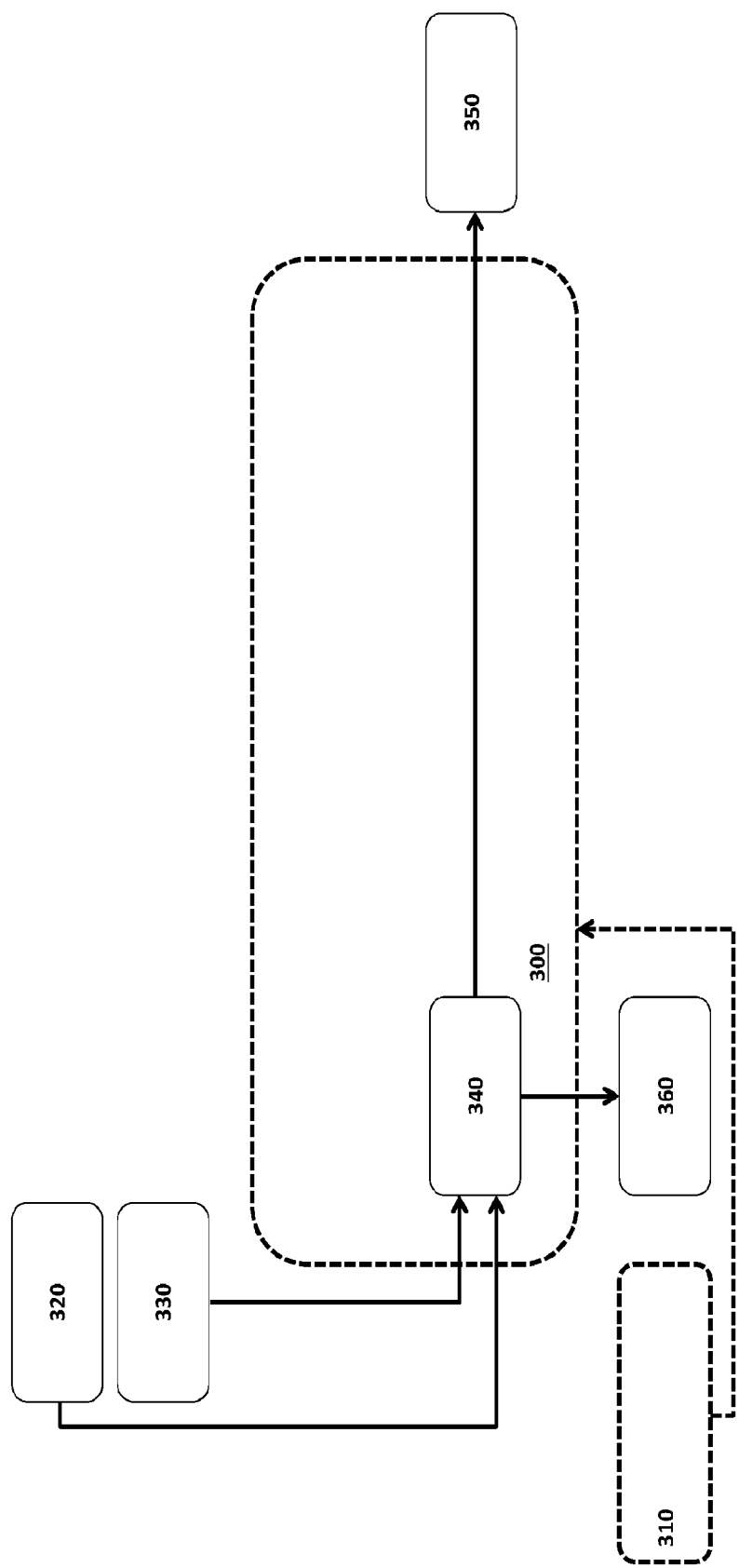
FIG. 3 provides a schematic representation of a shippable modular $CO_2$ sequestration unit that includes alkali enrichment subunit.

FIG. 3 provides a schematic view of a shippable modular $CO_2$ sequestration unit that includes a single alkali enrichment subunit. As shown in FIG. 3, shippable modular $CO_2$ sequestration unit 300 includes a housing 310 sized to be shippable, e.g., as described above. Housing 310 includes a first and second liquid material inputs 320 and 330, e.g., introducing first and second liquids (such a high salinity water and a low salinity water) into the housing. Operatively coupled to the liquid material inputs 320 and 330 is an alkali enrichment subunit 340. Alkali enrichment subunit 340 is also operatively coupled to alkalinity enriched liquid product output 350 which is configured to pass alkalinity enriched liquid product from the alkali enrichment subunit to the outside of the unit. Alkali enrichment subunit 340 is also operatively coupled to waste liquid product output 360 which is configured to pass waste liquid from the alkali enrichment subunit to the outside of the unit. While only a single alkali enrichment subunit is illustrated in the embodiment shown in FIG. 3, as described above, a given unit may include 2 or more, such as 3 or more, including 4 or more alkali enrichment subunits, as desired.

As discussed above, a given shippable modular $CO_2$ sequestration unit may include a single type of $CO_2$ sequestration subunit (where the unit may include one or more of the subunits) or a given shippable modular $CO_2$ sequestration unit may include two or more different types, such as three or more different types of $CO_2$ sequestration subunits (where the unit may include one or more of each of the different types of subunits). For example, a given a given shippable modular $CO_2$ sequestration unit may include an AE subunit and a $CO_2$ gas/liquid contactor subunit; a $CO_2$ gas/liquid contactor subunit and a carbonate production subunit; a carbonate production subunit and an AE subunit; all three of an AE subunit, a $CO_2$ gas/liquid contactor subunit and a carbonate production subunit; etc.

Figure 4:
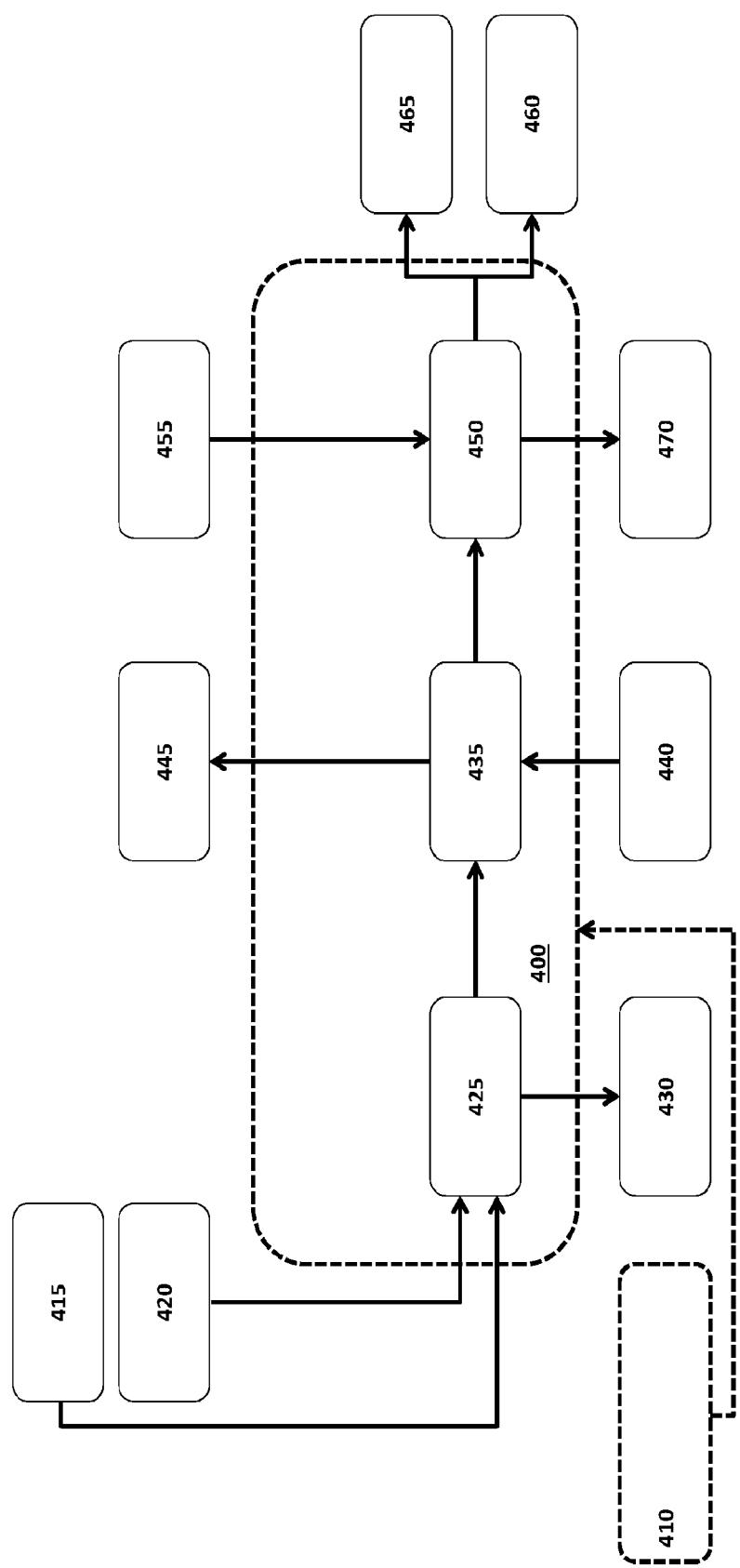
FIG. 4 provides a schematic representation of a shippable modular $CO_2$ sequestration unit that includes a $CO_2$/liquid contactor subunit; a carbonate production subunit and an alkali enrichment subunit.

An example if a shippable modular $CO_2$ sequestration unit that includes all three of an AE subunit, a $CO_2$ gas/liquid contactor subunit and a carbonate production subunit is illustrated in FIG. 4. As shown in FIG. 4, shippable modular $CO_2$ sequestration unit 400 includes housing 410 having liquid material inputs 415 and 420 for high salinity and low salinity waters, respectively. Operatively coupled to liquid material inputs 415 and 420 is alkali enrichment subunit 425. Alkali enrichment subunit 425 is operatively coupled to waste water output 430 configured to convey water from the AE subunit 425 to the outside of the container. AE subunit 425 is also operatively coupled to $CO_2$ gas/liquid contactor 435 so as to convey alkalinity enriched liquid from the AE subunit to the contactor 435. Contactor 435 is also operatively coupled to gaseous material input 440. Contactor 435 is operatively coupled to treated gas output 445 which conveys $CO_2$ depleted gas from the contactor to outside the modular unit. Contactor 435 is also operatively coupled to carbonate production subunit 450 in a manner sufficient to convey bicarbonate rich liquid produced in the contactor to the carbonate production subunit 450. Carbonate production subunit 450 is configured to produce a non-slurry carbonate product from the bicarbonate rich liquid produced by the contactor subunit and a divalent cation source, such as hard water. As such, the carbonate production subunit 450 is operatively coupled to divalent cation liquid input 455. Carbonate production subunit 450 is operatively coupled to non-slurry carbonate product (e.g., carbonate coated sand) output 460 and gas product (e.g., pure $CO_2$ gas) output 465. Carbonate production subunit 450 is also operatively coupled to waste water disposal 470.

Modular $CO_2$ Sequestration Unit Systems

Aspects of the invention further include systems configured to sequester $CO_2$ from a gaseous source of $CO_2$, where the systems include a plurality of operably coupled shippable modular units, e.g., as described above. A given system may include two or more, such as three or more, four or more, five or more, ten or more, twenty-five or more, including fifty or more shippable modular units. The modular units of a given system may be arranged in parallel and/or in series, as desired. For example, a system may include two or more AE subunit containing units arranged in parallel, where the alkalinity enriched liquid out of each of the AE subunit containing units is combined and then conveyed to a contactor subunit containing modular unit, where bicarbonate rich product liquid output of the contactor subunit containing unit is then conveyed to a carbonate production subunit containing unit.

Figure 5:
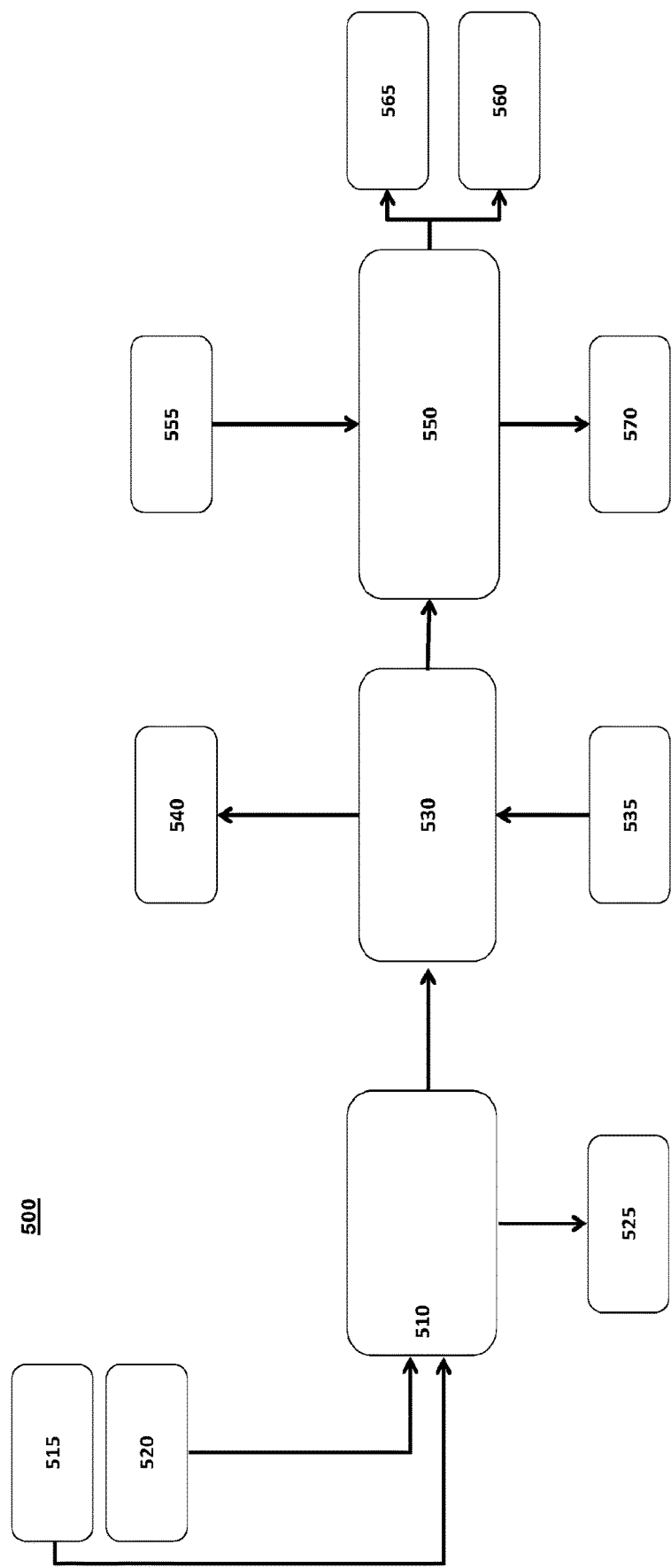
FIG. 5 provides a schematic representation of a system made up of three distinct shippable modular $CO_2$ sequestration units, one of which includes a $CO_2$/liquid contactor subunit; one of which includes a carbonate production subunit and one of which includes an alkali enrichment subunit.

An example of a system made up of multiple shippable modular units is schematically illustrated in FIG. 5. As shown in FIG. 5, system 500 includes a first shippable modular unit 510, which contains an AE subunit. Modular unit 510 is operatively coupled to first and second liquid inputs 515 and 520, which are configured to introduce high salinity and low salinity waters into the AE containing unit, respectively. AE unit 510 includes waste water product output 525, and is operatively coupled to shippable modular unit 530 which contains a $CO_2$ gas/liquid contactor subunit so as to convey alkalinity enriched liquid from the AE containing unit 510 to the contactor containing unit 530. Contactor unit includes $CO_2$ containing gas input 535 and $CO_2$ deplete gas output 540. Contacting containing unit 530 is operatively coupled go carbonate production unit 550 in order to convey bicarbonate rich liquid produced by the contactor unit to the carbonate production unit 550, which contains a carbonate production subunit, e.g., as described above. Carbonate production unit 550 is configured to produce a non-slurry carbonate product from the bicarbonate rich liquid produced by the contactor unit and a divalent cation source, such as hard water. As such, the carbonate production subunit 550 is operatively coupled to divalent cation liquid input 555. Carbonate production subunit 550 is operatively coupled to non-slurry carbonate product (e.g., carbonate coated sand) output 560 and gas product (e.g., pure $CO_2$ gas) output 565. Carbonate production unit 550 is also operatively coupled to waste water disposal 570.

Methods of Sequestering $CO_2$

Also provided are methods of using the shippable modular $CO_2$ sequestration units and systems thereof in $CO_2$ sequestration applications, i.e., methods of sequestering $CO_2$. By $CO_2$ sequestration application is meant a method or process of sequestering $CO_2$ which results in $CO_2$ sequestration. As reviewed above, by "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ in a number of different ways, e.g., by producing a $CO_2$ sequestering product, e.g., a carbonate material, and/or by producing a substantially pure subsurface injectable $CO_2$ product gas from an amount of initial $CO_2$, such that the $CO_2$ is sequestered. The $CO_2$ sequestering product may be a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Aspects of the methods include introducing a $CO_2$ containing gas and one or more waters into a $CO_2$ sequestration system (which may be made up of either (a) a single shippable modular unit configured to carry out all tasks in a given $CO_2$ sequestration process or (b) two or more different shippable modular units which collectively are configured to carry out all tasks in a $CO_2$ sequestration process, e.g., as described above) and obtaining from the system a $CO_2$ sequestering carbonate product, and in some instances one or more byproducts, e.g., pure $CO_2$ gas, etc. A given system is configured to at least contact a $CO_2$ gas with a liquid to produce a $CO_2$ charged liquid, as well to manipulate the $CO_2$ charged liquid in a manner sufficient to produce a $CO_2$ sequestering carbonate product. In some instances where the system includes an AE unit, the methods of using the systems further include an alkali enrichment step. Each of these steps is now described in greater detail.

$CO_2$ Gas/Liquid Contact

As the systems include a $CO_2$ gas/liquid contact subunit, embodiments of methods as described herein include a step of contacting a gaseous source of $CO_2$ with a liquid under conditions sufficient for $CO_2$ molecules in the gas to dissolve into the liquid and thereby be separated from the gas, e.g., to produce a $CO_2$ charged liquid, which may be a liquid condensed phase (LCP) containing liquid. As such, aspects of such embodiments include contacting a $CO_2$ containing gas with an aqueous medium to remove $CO_2$ from the $CO_2$ containing gas.

The $CO_2$-containing gas that is contacted with the $CO_2$ sequestration liquid to produce the high DIC containing liquid may be pure $CO_2$ or be combined with one or more other gasses and/or particulate components, depending upon the source, e.g., it may be a multi-component gas (i.e., a multi-component gaseous stream). While the amount of $CO_2$ in such gasses may vary, in some instances the $CO_2$-containing gases have a $pCO_2$ of $10^3$ or higher, such as $10^4$ Pa or higher, such as $10^5$ Pa or higher, including $10^6$ Pa or higher. The amount of $CO_2$ in the $CO_2$-containing gas, in some instances, may be 20,000 or greater, e.g., 50,000 ppm or greater, such as 100,000 ppm or greater, including 150,000 ppm or greater, e.g., 500,000 ppm or greater, 750,000 ppm or greater, 900,000 ppm or greater, up to and including 1,000,000 ppm or greater (in pure $CO_2$ exhaust the concentration is 1,000,000 ppm) and in some instances may range from 10,000 to 500,000 ppm, such as 50,000 to 250,000 ppm, including 100,000 to 150,000 ppm. The temperature of the $CO_2$-containing gas may also vary, ranging in some instances from 0 to 1800° C., such as 100 to 1200° C. and including 600 to 700° C. In some instances, a $CO_2$-containing gas is not pure $CO_2$, in that it contains one or more additional gasses and/or trace elements. Additional gasses that may be present in the $CO_2$-containing gas include, but are not limited to water, nitrogen, mononitrogen oxides, e.g., NO, $NO_2$, and $NO_3$, oxygen, sulfur, monosulfur oxides, e.g., SO, $SO_2$ and $SO_3$), volatile organic compounds, e.g., benzo(a)pyrene $C_2OH_{12}$, benzo(g,h,l)perylene $C_{22}H_{12}$, dibenzo(a,h)anthracene $C_{22}H_{14}$, etc. Particulate components that may be present in the $CO_2$-containing gas include, but are not limited to particles of solids or liquids suspended in the gas, e.g., heavy metals such as strontium, barium, mercury, thallium, etc.

In certain embodiments, $CO_2$-containing gases are obtained from an industrial plant, e.g., where the $CO_2$-containing gas is a waste feed from an industrial plant. Industrial plants from which the $CO_2$-containing gas may be obtained, e.g., as a waste feed from the industrial plant, may vary. Industrial plants of interest include, but are not limited to, power plants and industrial product manufacturing plants, such as but not limited to chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

Where the $CO_2$ containing gas is a multi-component gaseous medium that includes $CO_2$ and other gases, e.g., as described above, the $CO_2$ containing gas may be processed to increase the partial pressure of $CO_2$ in the gas prior to contact with the $CO_2$ capture liquid. In such instances, the magnitude of increase of the $CO_2$ in the $CO_2$ containing gas may vary, where in some instances the increase may be 5% (v/v) or more, such as 10% (v/v) or more, 20% (v/v) or more, 25% (v/v) or more or more, 50% (v/v) or more, 75% (v/v) or more, including 80 to 90% (v/v) or more. For example, where the gaseous components of non-treated flue gas input stream contain <1-20% (v/v) $CO_2$, the gaseous stream may be processed to produce a treated flue gas output stream that contains 30-90% (v/v) $CO_2$. While separation of non-$CO_2$ components from a gaseous stream may be accomplished using any convenient protocol, in some instances a membrane mediated gas separation protocol is employed. While such protocols may vary, a number of $CO_2$ selective membrane mediated gas separation protocols may be used, including but not limited to: those described in Ramasubramian et al., "Membrane processes for carbon capture from coal-fired power plant flue gas: A modeling and cost study," J. Membrane Science (2012) 421-422: 299-310; Published PCT Application Serial No. WO/2006/050531 titled "Membranes, Methods Of Making Membranes, And Methods Of Separating Gases Using Membranes" and plastic-based, nano-engineered membranes (e.g., from Membrane Research Group (MEMFO) at the Chemical Engineering Department of the Norwegian University of Science and Technology (NTNU)) as described in Biopact at "http://news.mongabay.com/bioenergy/2007/09/new-plastic-based-nano-engineered-co2.html"; the disclosures of which are herein incorporated by reference.

The $CO_2$ gas/liquid contactor may contact the $CO_2$ containing gas with a variety of different types of liquids, where liquids of interest include a variety of different aqueous media. Aqueous media that may be contacted with the gaseous source of $CO_2$ (i.e., the $CO_2$ containing gas) may vary, ranging from fresh water to bicarbonate buffered aqueous media. Bicarbonate buffered aqueous media employed in embodiments of the invention include liquid media in which a bicarbonate buffer is present. As such, liquid aqueous media of interest include dissolved $CO_2$, water, carbonic acid ($H_2CO_3$), bicarbonate ions ($HCO_3^-$), protons ($H^+$) and carbonate ions ($CO_3^{2-}$). The constituents of the bicarbonate buffer in the aqueous media are governed by the equation:

$$CO_2 + H_2O \rightleftarrows H_2CO_3 \rightleftarrows H^+ + HCO_3^- \rightleftarrows 2H^+ + CO_3^{2-}$$

The pH of the bicarbonate buffered aqueous media may vary, ranging in some instances from 7 to 11, such as 8 to 11, e.g., 8 to 10, including 8 to 9. In some instances, the pH ranges from 8.2 to 8.7, such as from 8.4 to 8.55. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Of interest in some instances are waters that provide for excess alkalinity, which is defined as alkalinity that is provided by sources other than bicarbonate ion. In these instances, the amount of excess alkalinity may vary, so long as it is sufficient to provide 1.0 or slightly less, e.g., 0.9, equivalents of alkalinity. Waters of interest include those that provide excess alkalinity (meq/liter) of 30 or higher, such as 40 or higher, 50 or higher, 60 or higher, 70 or higher, 80 or higher, 90 or higher, 100 or higher, etc. Where such waters are employed, no other source of alkalinity, e.g., NaOH, is required.

In some instances, the aqueous medium that is contacted with the $CO_2$ containing gas is one which, in addition to the bicarbonate buffering system (e.g., as described above), further includes an amount of divalent cations. Inclusion of divalent cations in the aqueous medium can allow the concentration of bicarbonate ion in the bicarbonate rich product to be increased, thereby allowing a much larger amount of $CO_2$ to become sequestered as bicarbonate ion in the bicarbonate rich product. In such instances, bicarbonate ion concentrations that exceed 5,000 ppm or greater, such as 10,000 ppm or greater, including 15,000 ppm or greater may be achieved. For instance, calcium and magnesium occur in seawater at concentrations of 400 and 1200 ppm respectively. Through the formation of a bicarbonate rich product using seawater (or an analogous water as the aqueous medium), bicarbonate ion concentrations that exceed 10,000 ppm or greater may be achieved.

In such embodiments, the total amount of divalent cation source in the medium, which divalent cation source may be made up of a single divalent cation species (such as $Ca^{2+}$) or two or more distinct divalent cation species (e.g., $Ca^{2+}$, $Mg^{2+}$, etc.), may vary, and in some instances is 100 ppm or greater, such as 200 ppm or greater, including 300 ppm or greater, such as 500 ppm or greater, including 750 ppm or greater, such as 1,000 ppm or greater, e.g., 1,500 ppm or greater, including 2,000 ppm or greater. Divalent cations of interest that may be employed, either alone or in combination, as the divalent cation source include, but are not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$ and the like. Other cations of interest that may or may not be divalent include, but are not limited to: $Na^+$, $K^+$, $NH^{4+}$, and $Li^+$, as well as cationic species of Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Naturally occurring aqueous media which include a cation source, divalent or otherwise, and therefore may be employed in such embodiments include, but are not limited to: aqueous media obtained from seas, oceans, estuaries, lagoons, brines, alkaline lakes, inland seas, etc.

In some instances, the aqueous medium is one that has been subjected to an alkali enrichment process, such as a membrane mediated alkali enrichment process, e.g., by receiving the aqueous medium from an AE modular unit or subunit, such as described above. Alkali enrichment processes of interest include, but are not limited to, those described in U.S. patent application Ser. No. 14/636,043; the disclosures of which are herein incorporated by reference.

In some instances, amines, including primary, secondary and tertiary amines, may be provided as enhancers of $CO_2$ solvation and/or catalysts in bicarbonate ion formation. Primary amines of interest include, but are not limited to: ammonia, 2-amino-2-hydroxymethyl-propane-1,3-diol (TRIS), monoethanolamine (MEA), 2-amino-2-methyl-1-propanol (AMP), melamine, amino-2-propanol, arginine, poly-arginine, etc. Secondary amines of interest include, but are not limited to: diethanolamine (DEA), morpholine, 2-(tert-butylamino)ethanol (TBAE), bis(2-hydroxypropyl) amine, piperazine, am inoethylethanolamine, N-[Tris(hydroxymethyl)methyl]-3-aminopropanesulfonic acid (TAPS), etc. Tertiary amines of interest are, but are not limited to: 2,2',2",2'''-(ethylenedinitrilo)tetraethanol (THEED), methyldiethanolamine (MDEA), poly-melamine-formaldehyde (Tysol SM), triethanolamine (TEOA), triethanolamine acetate, tris(2-hydroxypropyl)amine, etc. When present, the amount of these amines may vary, and in some instances ranges from 1% to 80%, such as 10.2% to 21.7% dry wt. Further details regarding such enhancers are provided in U.S. patent application Ser. No. 14/112,495; the disclosures of which are herein incorporated by reference.

Contact of the $CO_2$ containing gas and the liquid is done under conditions sufficient to remove $CO_2$ from the $CO_2$ containing gas (i.e., the $CO_2$ containing gaseous stream), and increase the dissolved inorganic carbon (including bicarbonate ion) concentration of the aqueous medium. The $CO_2$ containing gas may be contacted with the aqueous medium using any convenient protocol, which may vary depending on the configuration of the $CO_2$/liquid contactor subunit of the system. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, packed column reactors, aqueous froth filters (e.g., as described in U.S. Pat. Nos. 7,854,791; 6,872,240; 6,616,733, as well as Published U.S. Patent Application Nos. 20140245887 and WO2005/014144; the disclosures of which are herein incorporated by reference); and the like, as may be convenient. The process may be a batch or continuous process.

In some instances, the gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725; 6,872,240 and 5,695,545; the disclosures of which are herein incorporated by reference. In some instances, the microporous hollow fiber membrane contactor that is employed is a Liqui-Cel® hollow fiber membrane contactor (available from Membrana, Charlotte N.C.), which membrane contactors include polypropylene membrane contactors and polyolefin membrane contactors.

Contact between the liquid and the $CO_2$-containing gas occurs under conditions such that a substantial portion of the $CO_2$ present in the $CO_2$-containing gas goes into solution, e.g., to produce bicarbonate ions. By substantial portion is meant 10% or more, such as 50% or more, including 80% or more. The temperature of the capture liquid that is contacted with the $CO_2$-containing gas may vary. In some instances, the temperature ranges from −1.4 to 100° C., such as 20 to 80° C. and including 40 to 70° C. In some instances, the temperature may range from −1.4 to 50° C. or higher, such as from −1.1 to 45° C. or higher. In some instances, cooler temperatures are employed, where such temperatures may range from −1.4 to 4° C., such as −1.1 to 0° C. In some instances, warmer temperatures are employed. For example, the temperature of the capture liquid in some instances may be 25° C. or higher, such as 30° C. or higher, and may in some embodiments range from 25 to 50° C., such as 30 to 40° C. The $CO_2$-containing gas and the liquid are contacted at a pressure suitable for production of a desired $CO_2$ charged liquid. In some instances, the pressure of the contact conditions is selected to provide for optimal $CO_2$ absorption, where such pressures may range from 1 ATM to 100 ATM, such as 1 to 50 ATM, e.g., 20-30 ATM or 1 ATM to 10 ATM. Where contact occurs at a location that is naturally at 1 ATM, the pressure may be increased to the desired pressure using any convenient protocol. In some instances, contact occurs where the optimal pressure is present, e.g., at a location under the surface of a body of water, such as an ocean or sea. In some instances, contact of the $CO_2$-containing gas and the alkaline aqueous medium occurs a depth below the surface of the water (e.g., the surface of the ocean), where the depth may range in some instances from 10 to 1000 meters, such as 10 to 100 meters. In some instances, the $CO_2$ containing gas and $CO_2$ capture liquid are contacted at a pressure that provides for selective absorption of $CO_2$ from the gas, relative to other gases in the $CO_2$ containing gas, such as $N_2$, etc. In these instances, the pressure at which the $CO_2$ containing gas and capture liquid are contacted may vary, ranging from 1 to 100 atmospheres (atm), such as 1 to 10 atm and including 20 to 50 atm.

Contact between the liquid and the $CO_2$-containing gas results in the production of a DIC containing liquid. As such, in charging the $CO_2$ capture liquid with $CO_2$, a $CO_2$ containing gas may be contacted with $CO_2$ capture liquid under conditions sufficient to produce dissolved inorganic carbon (DIC) in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2-}]$ is the carbonate concentration in the solution. The DIC of the aqueous media may vary, and in some instances may be 5,000 ppm or greater, such as 10,000 ppm or greater, including 15,000 ppm or greater. In some instances, the DIC of the aqueous media may range from 5,000 to 20,000 ppm, such as 7,500 to 15,000 ppm, including 8,000 to 12,000 ppm. The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 10, e.g., 8 to 8.5.

In some instances where the gaseous source of $CO_2$ is a multicomponent gaseous stream, contact occurs in a manner such that $CO_2$ is selectively absorbed by the $CO_2$ absorbing aqueous medium. By selectively absorbed is meant that the $CO_2$ molecules preferentially go into solution relative to other molecules in the multi-component gaseous stream, such as $N_2$, $O_2$, Ar, CO, $H_2$, $CH_4$ and the like.

Where desired, the $CO_2$ containing gas is contacted with the capture liquid in the presence of a catalyst (i.e., an absorption catalyst, either hetero- or homogeneous in nature) that mediates the conversion of $CO_2$ to bicarbonate. Of interest as absorption catalysts are catalysts that, at pH levels ranging from 8 to 10, increase the rate of production of bicarbonate ions from dissolved $CO_2$. The magnitude of the rate increase (e.g., as compared to control in which the catalyst is not present) may vary, and in some instances is 2-fold or greater, such as 5-fold or greater, e.g., 10-fold or greater, as compared to a suitable control. In some instances, the catalyst is a carbon dioxide-specific catalyst. Examples of carbon dioxide-specific catalysts of interest include enzymes, such as carbonic anhydrases, synthetic catalysts, such as those transition metal catalysts described in Koziol et al., "Toward a Small Molecule, Biomimetic Carbonic Anhydrase Model: Theoretical and Experimental Investigations of a Panel of Zinc(II) Aza-Macrocyclic Catalysts," Inorganic Chemistry (2012) 51: 6803-6812, colloidal metal particles, such as those described in Bhaduri and Siller, "Nickel nanoparticles catalyse reversible hydration of carbon dioxide for mineralization carbon capture and storage," Catalysis Science & Technology (2013) DOI: 10.1039/c3cy20791a, and the like, e.g., colloidal metal oxide particles. Carbonic anhydrases of interest include both naturally occurring (i.e., wild-type) carbonic anhydrase, as well as mutants thereof. Specific carbonic anhydrases of interest include, but are not limited to: α-CAs, which include mammalian carbonic anhydrases, e.g., the cytosolic CAs (CA-I, CA-II, CA-III, CA-VII and CA XIII) (CA1, CA2, CA3, CA7, CA13), mitochondrial CAs (CA-VA and CA-VB) (CA5A, CA5B), secreted CAs (CA-VI) (CA6), and membrane-associated CAs (CA-IV, CA-IX, CA-XII, CA-XIV and CA-XV) (CA4, CA9, CA12, CA14); β-CAs, which include prokaryotic and plant chloroplast CAs; γ-CAs, e.g., such as found in methane-producing bacteria; and the like. Carbonic anhydrases of interest further include those described in U.S. Pat. No. 7,132,090, the disclosure of which is herein incorporated by reference. Carbonic anhydrases of interest include those having a specific activity of $10^3$ $s^{-1}$ or more, such as $10^4$ $s^{-1}$ to or more, including $10^5$ $s^{-1}$ or more. When employed, the catalyst is present in amount effective to provide for the desired rate increase of bicarbonate production, e.g., as described above. In some instances where the catalyst is an enzyme, the activity of the enzyme in the aqueous media may range from $10^3$ to $10^6$ $s^{-1}$, such as $10^3$ to $10^4$ $s^{-1}$ and including $10^5$ to $10^6$ $s^{-1}$. When employed, a catalyst, e.g., enzyme such as a carbonic anhydrase, can be made available in the reaction using any convenient approach, such as through a solid support (such as a permeable membrane) to which the catalyst is attached or otherwise with which the catalyst is stably associated, through porous media and the like having the catalyst stably associated therewith, large surfaces with the catalyst immobilized therein (i.e., attached thereto), or with the catalyst in solution, e.g., which may be recovered following use. Examples of catalyst formats that may be employed include, but are not limited to, those described in U.S. Pat. No. 7,132,090; the disclosure of which is herein incorporated by reference. Synthetic catalysts of interest include synthetically prepared transition metal containing complexes, prepared as biomimetic models of carbonic anhydrase enzymes, e.g., as described above. Specific synthetic catalysts include, but are not limited to: transition metal aza-macrocyclic catalysts, e.g., the zinc(II) aza-macrocyclic catalysts having macrocyclic rings of 9, 12, 13, or 14, as described in Koziol et al., "Toward a Small Molecule, Biomimetic Carbonic Anhydrase Model: Theoretical and Experimental Investigations of a Panel of zinc(II) Aza-Macrocyclic Catalysts," Inorganic Chemistry (2012) 51: 6803-6812, imidazole- and indole-based metal catalysts, e.g., the zinc(II) catalysts described in United States Published Application No. US20110293496, United States Published Application No. US20120199535 and United States Published Application No. US20110151537, aminopyridyl-based catalysts, e.g., as described in Feng et al., "A Highly Reactive Mononuclear Zn(II) Complex for Phosphodiester Cleavage," Journal of the American Chemical Society (2005) 127: 13470-13471, pyrazolylhydroborato- and pyridylthiomethyl-based compounds, e.g., as described in Sattler and Parkin, "Structural characterization of zinc bicarbonate compounds relevant to the mechanism of action of carbonic anhydrase," Chemical Science (2012) 3: 2105-2109. Synthetic catalysts of interest include those having a specific activity of $10^2$ or more, such as $10^3$ $s^{-1}$ or more, including $10^4$ $s^{-1}$ or more. When employed, the synthetic catalyst is present in amount effective to provide for the desired rate increase of bicarbonate production, e.g., as described above for carbonic anhydrase. When employed, a synthetic catalyst, e.g., aza-macrocyclic transition metal catalyst, can be made available in the reaction using any convenient approach, e.g., as described above for carbonic anhydrase. Metal nanoparticles of interest include commercially available as well as synthetically prepared colloidal particles of transition metals. Specific colloidal metal particles include, but are not limited to: metal nanoparticles, e.g., the nickel nanoparticles (NiNPs) described in Bhaduri and Siller, "Nickel nanoparticles catalyse reversible hydration of carbon dioxide for mineralization carbon capture and storage," Catalysis Science & Technology (2013) DOI: 10.1039/c3cy20791a. Colloidal metal particles of interest include those having a specific activity of $10^2$ or more, such as $10^3$ $s^{-1}$ or more, including $10^4$ $s^{-1}$ or more. When employed, the colloidal metal particles are present in amount effective to provide for the desired rate increase of bicarbonate production, e.g., as described above for carbonic anhydrase. When employed, the colloidal metal particles, e.g., transition metal nanoparticles, can be made available in the reaction using any convenient approach, e.g., as described above for carbonic anhydrase. Metal nanoparticle catalysts finding use in embodiments described herein are further described in U.S. Provisional Application Ser. No. 61/793,585 filed on Mar. 15, 2013; the disclosure of which is herein incorporated by reference. Catalysts of interest are further described in U.S. patent application Ser. No. 14/112,495; the disclosure of which is herein incorporated by reference.

The $CO_2$ gas/liquid contactor unit/subunit produces a $CO_2$ charged liquid. In some embodiments, the resultant $CO_2$ charged liquid is a bicarbonate-containing liquid, where in in some instances, the bicarbonate-containing liquid is a two phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid.

LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution.

The bulk phase and LCP are characterized by having different $K_{eq}$, different viscosities, and different solubilities between phases. Bicarbonate, carbonate, and divalent ion constituents of the LCP droplets are those that, under appropriate conditions, may aggregate into a post-critical nucleus, leading to nucleation of a solid phase and continued growth. While the association of bicarbonate ions with divalent cations, e.g., $Ca^{2+}$, in the LCP droplets may vary, in some instances bidentate bicarbonate ion/divalent cation species may be present. For example, in LCPs of interest, $Ca^{2+}$/bicarbonate ion bidentate species may be present. While the diameter of the LCP droplets in the bulk phase of the LCP may vary, in some instances the droplets have a diameter ranging from 1 to 500 nm, such as 10 to 100 nm. In the LCP, the bicarbonate to carbonate ion ratio, (i.e., the $HCO_3^-$/$CO_3^{2-}$ ratio) may vary, and in some instances is 10 or greater to 1, such as 20 or greater to 1, including 25 or greater to 1, e.g., 50 or greater to 1. Additional aspects of LCPs of interest are found in Bewernitz et al., "A metastable liquid precursor phase of calcium carbonate and its interactions with polyaspartate," Faraday Discussions. 7 Jun. 2012. DOI: 10.1039/c2fd20080e (2012) 159: 291-312. The presence of LCPs may be determined using any convenient protocol, e.g., the protocols described in Faatz et al., Advanced Materials, 2004, 16, 996-1000; Wolf et al., Nanoscale, 2011, 3, 1158-1165; Rieger et al., Faraday Discussions, 2007, 136, 265-277; and Bewernitz et al., Faraday Discussions, 2012, 159, 291-312.

Where the bicarbonate-containing solution has two phases, e.g., as described above, the first phase may have a higher concentration of bicarbonate ion than a second phase, where the magnitude of the difference in bicarbonate ion concentration may vary, ranging in some instances from 0.1 to 4, such as 1 to 2. For example, in some embodiments, a bicarbonate rich product may include a first phase in which the bicarbonate ion concentration ranges from 1000 ppm to 5000 ppm, and a second phase where the bicarbonate ion concentration is higher, e.g., where the concentration ranges from 5000 ppm to 6000 ppm or greater, e.g., 7000 ppm or greater, 8000 ppm or greater, 9000 ppm or greater, 10,000 ppm or greater, 25,000 ppm or greater, 50,000 ppm or greater, 75,000 ppm or greater, 100,000 ppm, 500,000 or greater.

Where desired, following production of the LCP containing liquid, the resultant LCP containing liquid may be manipulated to increase the amount or concentration of LCP droplets in the liquid. As such, following production of the bicarbonate containing liquid, the bicarbonate containing liquid may be further manipulated to increase the concentration of bicarbonate species and produce a concentrated bicarbonate liquid. In some instances, the bicarbonate containing liquid is manipulated in a manner sufficient to increase the pH. In such instances, the pH may be increased by an amount ranging from 0.1 to 6 pH units, such as 1 to 3 pH units. The pH of the concentrated bicarbonate liquid of such as step may vary, ranging in some instances from 5.0 to 13.0, such as 6.5 to 8.5. The concentration of bicarbonate species in the concentrated bicarbonate liquid may vary, ranging in some instances from 1 to 1000 mM, such as 20 to 200 mM and including 50 to 100 mM. In some instances, the concentrated bicarbonate liquid may further include an amount of carbonate species. While the amount of carbonate species may vary, in some instances the carbonate species is present in an amount ranging from 0.01 to 800 mM, such as 10 to 100 mM. The pH of the bicarbonate liquid may be increased using any convenient protocol. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide (Ca(OH)$_2$), or magnesium hydroxide (Mg(OH)$_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydrogen ion, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide (NaNH$_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Another type of further manipulation following production that may be employed is a dewatering of the initial bicarbonate containing liquid to produce a concentrated bicarbonate containing liquid, e.g., a concentrated LCP liquid. Dewatering may be accomplished using any convenient protocol, such as via contacting the LCP composition with a suitable membrane, such as an ultrafiltration membrane, to remove water and certain species, e.g., NaCl, HCl, H$_2$CO$_3$ but retain LCP droplets, e.g., as described in greater detail in U.S. application Ser. No. 14/112,495; the disclosure of which is herein incorporated by reference.

As described above, catalysts may be employed in some embodiments, e.g., where a carbonic anhydrase (CA) is employed to increase the rate of reaction whereby gaseous carbon dioxide (CO$_2$) and water convert to bicarbonate (HCO$_3^-$) ion and a proton (H$^+$), or vice versa. When dissolved in aqueous solution, for example, in a solution used as a carbon capture solution and having an alkalinity concentration in the range of, for example, 1-2,000 millimolar (mM) equivalents, such as but not limited to 5-50, 75-800 or 900-2,200 mM alkalinity equivalents, CA significantly increases the rate of formation of HCO$_3^-$ upon contacting the solution with, for example, flue gas from an industrial emitter where the partial pressure of CO$_2$ in the flue gas is, for example, 0.1-99.9% by weight, such as but not limited to 0.5-1.5%, 4.0-17% or 45-98% CO2 by weight. Because the molecular mass of CA enzymes is on the order of kilodaltons (kDa), for example, 1-70 kDa, such as but not limited to 4-8, 15-30 or 45-65 kDa, soluble CA may be recovered by passing the solution through a membrane filtration system, for example, loose reverse osmosis membrane systems, nanofiltration membrane systems or tight ultrafiltration systems, that reject CA but pass solutions rich in HCO$_3^-$ ion, such as bicarbonate-rich liquid condensed phase (LCP) solutions as described above. The reject solution from the membrane system, one that contains the rejected CA, may be recirculated as desired in the process so as to continuously increase the rate of CO$_2$ conversion to HCO$_3^-$ from contacting the capture liquid with a CO$_2$ containing gas. The permeate solution from the membrane system, e.g., one that contains the passed LCP, may be further concentrated as desired, e.g., through a membrane filtration system (such as described above), for example, a nanofiltration membrane system, then used in a mineralization process, e.g., as described below.

CO$_2$ Sequestering Carbonate Production

Following preparation of the CO$_2$ charged liquid, e.g., bicarbonate-containing solution, the bicarbonate-containing solution or component thereof (e.g., LCP) may be manipulated to produce solid phase carbonate compositions, and therefore sequester CO$_2$ from the initial CO$_2$-containing gas into a solid form and produce a CO$_2$ sequestering carbonate material. By CO$_2$ sequestering carbonate material is meant a material that stores a significant amount of CO$_2$ in a storage-stable format, such that CO$_2$ gas is not readily produced from the material and released into the atmosphere. In certain embodiments, the CO$_2$-sequestering material includes 5% or more, such as 10% or more, including 25% or more, for instance 50% or more, such as 75% or more, including 90% or more of $CO_2$, e.g., present as one or more carbonate compounds. The $CO_2$-sequestering materials produced in accordance with methods of the invention may include one or more carbonate compounds, e.g., as described in greater detail below. The amount of carbonate in the $CO_2$-sequestering material, e.g., as determined by coulometry, may be 40% or higher, such as 70% or higher, including 80% or higher.

$CO_2$ sequestering materials, e.g., as described herein, provide for long-term storage of $CO_2$ in a manner such that $CO_2$ is sequestered (i.e., fixed) in the material, where the sequestered $CO_2$ does not become part of the atmosphere. When the material is maintained under conditions conventional for its intended use, the material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the material. With respect to the $CO_2$-sequestering materials, when they are employed in a manner consistent with their intended use and over their lifetime, the amount of degradation, if any, as measured in terms of $CO_2$ gas release from the product will not exceed 10% per year, such as 5% per year, and in certain embodiments, 1% per year. In some instances, $CO_2$-sequestering materials provided by the invention do not release more than 1%, 5%, or 10% of their total $CO_2$ when exposed to normal conditions of temperature and moisture, including rainfall of normal pH, for there intended use, for at least 1, 2, 5, 10, or 20 years, or for more than 20 years, for example, for more than 100 years. Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, or more than 1000 years).

In certain instances of such embodiments, the bicarbonate-containing liquid or component thereof (e.g., LCP) is combined with a divalent cation source. Any convenient divalent cation source may be employed. Divalent cations, such as alkaline earth metal cations, e.g., calcium and magnesium cations, are of interest. Cation sources of interest include, but are not limited to, the brine from water processing facilities, such as sea water desalination plants, brackish water desalination plants, groundwater recovery facilities, wastewater facilities, and the like, which produce a concentrated stream of solution high in cation contents. Also of interest as cation sources are naturally occurring sources, such as, but not limited to, native seawater and geological brines, which may have varying cation concentrations and may also provide a ready source of cations to trigger the production of carbonate solids from a bicarbonate rich product or component thereof (e.g., LCP), such as described in greater detail below. A given divalent cation source may be a solid or liquid, as desired. For example, a liquid divalent cation source may be employed. Alternatively, a solid divalent cation source, such as a particulate source (e.g., a powder) may be employed.

During the production of solid carbonate compositions from the bicarbonate-containing solution or component thereof (e.g., LCP), one mol of $CO_2$ may be produced for every 2 mols of bicarbonate ion from the bicarbonate-containing solution or component thereof (e.g., LCP). For example, where solid carbonate compositions are produced by adding calcium cation to the bicarbonate-containing solution or component thereof (e.g., LCP), the production of solid carbonate compositions, e.g., the form of amorphous calcium carbonate minerals, may proceed according to the following reaction:

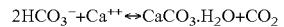

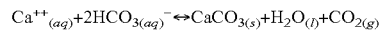

While the above reaction shows the production of 1 mol of $CO_2$, 2 moles of $CO_2$ from the $CO_2$-containing gas were initially converted to bicarbonate. As such, the overall process sequesters a net 1 mol of $CO_2$ and therefore is an effective $CO_2$ sequestration process, with a downhill thermodynamic energy profile of $-34$ kJ $mol^{-1}$ for the above reaction.

Where carbonate compositions are produced, e.g., as described above, from the $CO_2$ sequestration protocol, the product carbonate compositions may vary greatly. The carbonate product may include one or more different carbonate compounds, such as two or more different carbonate compounds, e.g., three or more different carbonate compounds, five or more different carbonate compounds, etc., including non-distinct, amorphous carbonate compounds. Carbonate compounds may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n.H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3.6H_2O$), and amorphous calcium carbonate ($CaCO_3$). Magnesium carbonate minerals of interest include, but are not limited to magnesite ($MgCO_3$), barringtonite ($MgCO_3.2H_2O$), nesquehonite ($MgCO_3.3H_2O$), lanfordite ($MgCO_3.5H_2O$), hydromagnesite, and amorphous magnesium calcium carbonate ($MgCO_3$). Calcium magnesium carbonate minerals of interest include, but are not limited to dolomite ($CaMg)(CO_3)_2$), huntite ($Mg_3Ca(CO_3)_4$) and sergeevite ($Ca_2Mg_{11}(CO_3)_{13}.H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the product ranges from 1.5-5 to 1, such as 2-4 to 1 including 2-3 to 1. In some instances, the product may include hydroxides, such as divalent metal ion hydroxides, e.g., calcium and/or magnesium hydroxides.

Carbonate Precipitation

In some instances, solid carbonate products are produced using a precipitation protocol, e.g., a protocol which results in the production of a slurry that includes precipitated carbonate products. Precipitation of solid carbonate compositions from a dissolved inorganic carbon (DIC) composition (e.g., an LCP composition as employed in a bicarbonate-mediated sequestration protocol), such as described above, results in the production of a composition that includes both precipitated solid carbonate compositions, as well as the remaining liquid from which the precipitated product was produced (i.e., the mother liquor). This composition may be present as a slurry of the precipitate and mother liquor. The resultant slurry is then output from the modular system, e.g., for storage or further manipulation, as desired. For example, the resultant precipitated product (i.e., solid carbonate composition) may be separated from the resultant mother liquor, e.g., by drying the solid carbonate composition to produce a dried solid carbonate composition, by subjecting the resultant slurry to a dewatering protocol to produce a solid carbonate material, etc. The term solid carbonate material refers to a variety of non-liquid formulations, such as paste like, putty like and dry compositions. In some instances, the dewatering includes contacting the precipitated carbonate composition with a membrane, e.g., an ultrafiltration membrane, to produce the solid carbonate material. In some instances, the method further includes producing unit sized objects from the paste, which unit sized objects may be cured, as desired, e.g., by contacting the objections with a setting solution. In some instances, the dewatering includes extruding the precipitated carbonate composition. In some instances, the extruding includes applying pressure to remove liquid from the paste. In some instances, the extruding includes applying negative pressure to remove air from the paste. In some instances, the method further includes introducing one or more property modulators into the process so that the solid carbonate material comprises the property modulator. Property modulators of interest may vary, and include but are not limited to reflectance modulators, pigments, biocides etc. The resultant product may further be disposed of or refined, e.g., to make various building materials, etc. Further details of carbonate precipitation protocols, products produced thereby and further uses thereof are described in U.S. patent application Ser. No. 14/636,043; the disclosure of which is herein incorporated by reference.

Non-Slurry Continuous Production Protocols

Instead of precipitation protocols, e.g., as described above, also of interest are non-slurry continuous protocols for production of $CO_2$ sequestering materials. As the processes are continuous, they are not batch processes. In practicing continuous processes of the invention, a divalent cation source, e.g., as described above, is introduced into a flowing aqueous bicarbonate and/or carbonate containing liquid (e.g., a bicarbonate rich product containing liquid as described above) under conditions sufficient such that a non-slurry solid phase $CO_2$ sequestering carbonate material is produced in the flowing aqueous bicarbonate rich product.

By "flowing" aqueous liquid is meant a liquid (such as described above) that is moving in or as in a stream, such that it is not stationary. The flow rate of the liquid, e.g., as determined relative to the site or location at which the divalent cations are introduced into the liquid, may vary. In some instances, the flow rate of the liquid ranges from 0.1 to 10 m/second, such as 0.2 to 2.0 m/s. In some instances, the flow rate of the liquid ranges from 10 LPD to 40B LPD (liters per day), such as 400,000 LPD to 12M LPD. In some instances, the liquid is flowing through a housing or containment structure, where the length of the flow path of the liquid may vary. In some instances, the flow path ranges in length from 0.10 m to 100 m, such as 1 m to 10 m and including 1 m to 5.0 m. Along a given flow path, the flow rate of the liquid may be constant or varied, as desired. For example, the flow rate may be faster at the site of divalent cation introduction relative to the site of $CO_2$ sequestering carbonate material production. The magnitude of any change in flow rate may vary, where the magnitude of such change, if present, ranges in some instances from 2 to 100 times, such as 5 to 20 times. The flow rate may be varied using any convenient protocol, e.g., by placing barriers in the flow path, adjusting the elevation of the flow path, etc.

The amount of divalent cation source that is introduced into the liquid is sufficient to provide for the desired solid phase $CO_2$ sequestering carbonate material. While the amount may vary, in some instances the amount that is introduced into the liquid is sufficient to provide a concentration of divalent cation in the liquid at a location in the flow path just before material production that ranges from 10 ppm to 10,000 ppm, such as 200 ppm to 2,000 ppm. Where the divalent cation source is a liquid source having a divalent cation concentration ranging from 500 ppm to 20,000 ppm, such as 1000 ppm to 5000 ppm, the liquid divalent cation source may be introduced into the flowing liquid at a rate ranging from 0.1 m/s to 10 m/s, such as 0.2 m/s to 4 m/s. Alternatively, where the divalent cation source is a dry powder having a divalent cation concentration of 10 to 80% wt/wt., the power divalent cation source may be introduced into the flowing liquid at a rate ranging from 0.2 m/s to 10 m/s, such as 0.2 m/s to 4 m/s.

As the process is a continuous process, upon initiation of the process no solid carbonate material product, apart from any seed structure (e.g., as described below), will be present in the production zone of the flow path before introduction of the divalent cations into the flowing liquid. In some embodiments, at a time following the initial introduction of the divalent cations, a precursor composition forms at location downstream from the divalent cation introduction site. While the time between initial introduction and the formation of the non-solid precursor structure may vary, in some instances the time ranges from 0.001 sec to 10 min, such as 0.1 sec to 1 min. In these embodiments, the precursor composition forms at a distance from the divalent cation introduction site, where the location may be downstream from the divalent cation introduction site by a varying distance, where this distance may range in some instances from 1 cm to 10 m, such as 2 cm to 2 m. The precursor composition may be characterized as a transient zone where the initial clusters of carbonate mineral have not yet formed a polytype of the carbonate mineral and are highly unstable, making them more likely to accrete on to a solid surface than to homogeneously crystallize in solution to become part of a slurry.

The zone of accretion (carbonate growth) is defined by saturation index where:

$$SI = \log(IAP/Ksp)$$

(IAP is the ion activity product over Ksp solubility product) in relation to the activation energy (Stumm & Morgan 1981) where:

$$\Delta G = 16 \pi \sigma^3 v^2/[3(kT \ln 5)^2$$

where σ is the interfacial energy, v is the molecular volume, k is Boltzmann's constant, T is the absolute temperature, Ln is the natural logarithm operator, S is the relative supersatruation.

The zone of accretion can furthermore be modified by pressure, temperature and flow rate. Supersaturated solutions between 1× and 1000× supersaturation are of interest, such as 10× and 500× super saturation and including 11× and 300× supersaturation. The zone of accretion may be of a transient nature such that periodic dosing of various divalent cations results in periodicity of saturation index flows through the system. Also periodic alkaline component solutions can be introduced to brine solutions or solutions containing divalent cations creating similar response. Periodicity similar to diurnal cyclic variance seen in geologic settings where beach rock forms (Ref. Sedimentary Geology, 33 (1982) 157-172.

The system may be catalyzed by pH modification in the acidic or basic direction or using any convenient protocol. Introduction of $CO_2$ or carbonic acid into the reactor vessel is one modality of acidifying the system and modifying the zone of accretion. Another modality is the introduction of acid, e.g., hydrochloric acid (HCl). In such instances, HCl concentrations between 0.01 and 20%, such as between 0.5 and 10%, including between 1 and 3% may be employed. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity modulation, e.g., increase or decrease, of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydrogen ion, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl) amide. Oxides including, for example, calcium oxide (CaO), magnesium oxide (MgO), strontium oxide (SrO), beryllium oxide (BeO), and barium oxide (BaO) are also suitable proton-removing agents that may be used.

Various condition parameters may be modulated during a given method to achieve a desired production of $CO_2$ sequestering carbonate material. For example, pressure may be maintained at a constant level along the flow path, or pressure may be modulated (i.e., varied) along the flow path, as desired. While the pressure may vary in a given method, in some instances the pressure ranges from 0.1 atm to 100 atm, such as 1 atm to 10 atm. In some embodiments, the pressure is varied, e.g., decreased, along the flow path. The magnitude of any change in pressure may vary, where the magnitude of such change, if present, ranges in some instances from 2 to 100 times, such as 5 to 10 times. The pressure may be varied using any convenient protocol, e.g., by reducing or increasing the volume of the flow path at a given location, fluid regime, etc. In some instances, the pressure is reduced at the location of $CO_2$ sequestering carbonate material relative to the divalent cation introduction site, e.g., where the magnitude of reduction may range from 0% to 100 or more %, such as 10% to 100%.

Alternatively or in addition, the temperature may be maintained at a constant level along the flow path, or modulated (i.e., varied) along the flow path, as desired. While the temperature may vary in a given method, in some instances the temperature ranges from −4° C. to +99° C., such as 0° C. to 80° C. In some embodiments, the temperature is varied, e.g., decreased or increased, along the flow path. The magnitude of any change in temperature may vary, where the magnitude of such change, if present, ranges in some instances from 1 to 50° C., such as 2 to 25° C. The temperature may be varied using any convenient protocol, e.g., by heating or cooling the liquid at various location(s) of the flow path.

In some instances, the solid phase $CO_2$ sequestering carbonate material is produced at a location that is downstream from the divalent cation source introduction site. By downstream is meant a location along the flow path in the direction of fluid flow that is separated from the divalent cation introduction site. The distance between the divalent cation introduction site and the material production site may vary, ranging in some instances from 1 cm to 2.5 km, such as 5 cm to 100 m.

Introduction of the divalent cation source into the flowing aqueous bicarbonate rich product containing liquid as described above results in the production of a non-slurry solid phase $CO_2$ sequestering carbonate material. By non-slurry solid phase is meant a solid phase that is not a slurry, i.e., if maintained under static conditions it would not be a suspension of small particles in a liquid. As such, upon cessation of flowing liquid through the material production zone, the solid phase material produced according to embodiments of the methods settles (i.e., falls) out of suspension in 10 min or less, such as 5 min or less, and in some instances 1 min or less. As the material is a non-slurry solid phase, in some instances the longest dimension of a given amount of the produced material is 30 µm or greater, such as 100 µm or greater, including 1000 µm or greater. In some instances the product material is a particulate composition that is made up of a plurality of distinct particles. In such instances, the plurality of distinct particles may vary in size, ranging in some instances from 10 to 1,000,000 µm, such as 1,000 to 100,000 µm and including 5,000 to 50,000 µm. In such compositions, the mean diameter of the particles may vary, and in some instances ranges from 20 to 20,000 µm, such as 200 to 8,000 µm. The particles of such compositions may be regular or irregular, where in some instances the particles are ooids. In these embodiments, the carbonate material may be produced by successive coating of carbonate compounds onto growing particles, resulting in production of particulates as described above. In some instances, the non-slurry solid phase $CO_2$ sequestering carbonate material is a lithified unitary object. While the dimensions of such an object may vary, in some instances the object has a longest dimension ranging from 1,000 to 100,000, such as 5,000 to 50,000 µm. In these instances, the lithified object(s) produced in the production zone may be produced by carbonate materials forming in pores or interstices of pre-existing structures, uniting and agglomerating such structures into lithified masses.

The $CO_2$ sequestering carbonate material produced as described above is a freshwater stable carbonate. By freshwater stable is meant that the carbonate material is a meta-stable carbonate compound(s) that, upon combination with fresh water, dissolves and produces a different mineral that is more stable in fresh water. The solubility of the product material in freshwater may vary, but in some instances has a Ksp of $10^{-7}$ or less, such as $10^{-6}$ or less, including $10^{-5}$ or less.

In some instances, the method includes producing the solid phase $CO_2$ sequestering carbonate material in association with a seed structure. By seed structure is meant a solid structure or material that is present flowing liquid, e.g., in the material production zone, prior to divalent cation introduction into the liquid. By "in association with" is meant that the material is produced on at least one of a surface of or in a depression, e.g., a pore, crevice, etc., of the seed structure. In such instances, a composite structure of the carbonate material and the seed structure is produced. In some instances, the product carbonate material coats a portion, if not all of, the surface of a seed structure. In some instances, the product carbonate materials fills in a depression of the seed structure, e.g., a pore, crevice, fissure, etc.

Seed structures may vary widely as desired. The term "seed structure" is used to describe any object upon and/or in which the product carbonate material forms. Seed structures may range from singular objects or particulate compositions, as desired. Where the seed structure is a singular object, it may have a variety of different shapes, which may be regular or irregular, and a variety of different dimensions. Shapes of interest include, but are not limited to, rods, meshes, blocks, etc. Also of interest are particulate compositions, e.g., granular compositions, made up of a plurality of particles. Where the seed structure is a particulate composition, the dimensions of particles may vary, ranging in some instances from 0.01 to 1,000,000 µm, such as 0.1 to 100,000 µm.

The seed structure may be made up of any convenient material or materials. Materials of interest include both carbonate materials, such as described above, as well as non-carbonate materials. The seed structures may be naturally occurring, e.g., naturally occurring sands, shell fragments from oyster shells or other carbonate skeletal allochems, gravels, etc., or man-made, such as pulverized rocks, ground blast furnace slag, fly ash, cement kiln dust, red mud, and the like. For example, the seed structure may be a granular composition, such as sand, which is coated with the carbonate material during the process, e.g., a white carbonate material or colored carbonate material, e.g., as described above.

In some instances, seed structure may be coarse aggregates, such as friable Pleistocene coral rock, e.g., as may be obtained from tropical areas (e.g., Florida) that are too weak to serve as aggregate for concrete. In this case the friable coral rock can be used as a seed, and the solid $CO_2$ sequestering carbonate mineral may be deposited in the internal pores, making the coarse aggregate suitable for use in concrete, allowing it to pass the LA Rattler abrasion test. In some instances, where a light weight aggregate is desired, the outer surface will only be penetrated by the solution of deposition, leaving the inner core relatively 'hollow' making a light weight aggregate for use in light weight concrete.

Methods as described herein may be carried out in a variety of different carbonate production subunit continuous reactors. Examples of continuous reactors of interest are further described below and in the Experimental section. Where a continuous reactor is employed, the location at which the $CO_2$ sequestering material is produced may be a fluidized bed subunit of the continuous reactor. Fluidized bed reactors of interest are configured to maintain a region of fluidized solids in a continuously flowing medium, and may have a fluid inlet, a fluid outlet, and a region of material production positioned there-between. A given fluidized bed reactor may have a single change or multiple chambers, as desired. Where desired, the fluidized bed may include structures, e.g., filters, meshes, frits, etc., or other retaining structures which serve to keep the product material in the fluidize bed.

Methods as described herein may further include separating the non-slurry solid phase $CO_2$ sequestering carbonate material from the aqueous bicarbonate rich product containing liquid. Any convenient separation protocol may be employed to remove the product material from the liquid. As such, the product material may be pulled out of the liquid, the liquid may be drained from the product material, etc., as desired. In some instances, the material is removed from the liquid while the liquid is still moving. In yet other instances the material is removed from the liquid after movement of the liquid has been stopped. Compared with protocols that produce slurry products, the energy associated with drying the product materials produced according to the methods described herein is much lower. While the magnitude of difference in energy usage may vary, in some instances the difference ranges from 2 to 100 times, such as 10 to 50 times per ton of material produced. One specific challenge inherent to the field of $CO_2$ sequestering material production is reducing the amount of energy consumed during the carbonation of $CO_2$. Common extraneous sources of energy use in production methods that produce a $CO_2$ sequestering precipitate material include the removal of water from the precipitated materials after formation. Reducing energy needs normally required to separate and potentially dry precipitated material form the bulk solution is important. As compared to process in which $CO_2$ sequestering precipitate materials are produced, embodiments of the present methods produce dried tons of $CO_2$ sequestering material using 2 to 100 times less energy, such as 10 to 50 times less energy, in the water separation/drying step.

Continuous processes for producing $CO_2$ sequestering non-slurry compositions as well as uses for the resultant products are further described in U.S. Provisional Application Ser. No. 62/062,084 filed on Oct. 9, 2014, the disclosure of which is herein incorporated by reference and in U.S.

Patent Application Ser. No. 62/096,340; the disclosure of which is herein incorporated by reference.

Alkali Enrichment

As summarized above, $CO_2$ sequestration methods of the invention may optionally include an alkali enrichment step or protocol. The alkali enrichment protocol may be employed once or two or more times during a given method, and at different stages of a given method. For example, an alkali enrichment protocol may be performed before and/or after a $CO_2$ capture liquid production step, e.g., as described in greater detail below.

By "alkali enrichment protocol" is meant a method or process of increasing the alkalinity of a liquid. The alkalinity increase of a given liquid may be manifested in a variety of different ways. In some instances, increasing the alkalinity of a liquid is manifested as an increase the pH of the liquid. For example, a liquid may be processed to remove hydrogen ions from the liquid to increase the alkalinity of the liquid. In such instances, the pH of the liquid may be increased by a desirable value, such as 0.10 or more, 0.20 or more, 0.25 or more, 0.50 or more, 0.75 or more, 1.0 or more, 2.0 or more, etc. In some instances, the magnitude of the increase in pH may vary, ranging in some instances from 0.1 to 10, such as 1 to 9, including 2.5 to 7.5, e.g., 3 to 7. As such, methods may increase the alkalinity of an initial liquid to produce a product liquid having a desired pH, where in some instances the pH of the product liquid ranges from 5 to 14, such as 6 to 13, including 7 to 12, e.g., 8 to 11, where the product liquid may be viewed as an enhanced alkalinity liquid. The increase in alkalinity of a liquid may also be manifested as an increase in the dissolved inorganic carbon (DIC) content of liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2-}]$ is the carbonate concentration in the solution. The DIC of the alkali enriched liquid may vary, and in some instances may be 500 ppm or greater, such as 5,000 ppm or greater, including 15,000 ppm or greater. In some instances, the DIC of the alkali enriched liquid may range from 500 to 20,000 ppm, such as 7,500 to 15,000 ppm, including 8,000 to 12,000 ppm. In some instances, alkali enrichment is manifested as an increase in the concentration of bicarbonate species, e.g., $NaHCO_3$, e.g., to a concentration ranging from 5 to 500 mMolar, such as 10 to 200 mMolar.

In some instances, the alkali enrichment protocol is a membrane mediated protocol. By membrane mediated protocol is meant a process or method which employs a membrane at some time during the method. As such, membrane mediated alkali enrichment protocols are those alkali enrichment processes in which a membrane is employed at some time during the process. While a given membrane mediated alkali enrichment protocol may vary, in some instances the membrane mediated protocol includes contacting a first liquid, e.g., a feed liquid, and a second liquid, e.g., a draw liquid, to opposite sides of a membrane.

Membrane mediated alkali enrichment protocols may vary, so long as they produce an enhanced alkalinity liquid from an initial liquid, as described above. As such, a variety of different types of membranes, membrane configurations, contact protocols, first and second liquid pairings, etc., may be employed, where selection of a particular set of protocol parameters may depend on a number of different factors, such as the nature of the first and second liquids that are available, for what purpose the alkali enrichment protocol is employed (e.g., to produce a $CO_2$ capture liquid, to increase the alkalinity of a $CO_2$ charged liquid, etc.).

The conditions of the alkali enrichment step may vary as desired. The temperature of the liquids may vary, ranging in some instances from 0 to 100° C., such as 4 to 80° C. The temperatures of the liquids may be the same or different. When different, the magnitude of any temperature variation may vary, ranging in some instances from 0.1 to 95° C., such as 30 to 45° C. The pressure of the liquids may also vary, ranging in some instances from 1 to 30 bar, such as 1.5 to 2 bar. When different, the magnitude of any pressure variation may vary, ranging in some instances from 0.1 to 30 bar, such as 0.5 to 1 bar. The flow rates of the liquids may be the same or different, and in some instances range from 0.25 to 10 gallon/min, such as 0.5 to 1 gallon/min. When different, the magnitude of any flow rate variation between the draw and feed may vary, and in some instances ranges from 0.05 to 9.75 gallon/min, such as 1 to 3 gallon/min. Forward osmosis mediated alkali enrichment protocols (also referred to sometimes as alkali recovery protocols) are further described in U.S. Provisional Application Ser. No. 61/990, 486 filed on May 8, 2014, the disclosure of which is herein incorporated by reference.

The nature of the first (i.e., initial) and second liquids that are processed in methods of the invention may vary. The initial liquid may be any liquid for which an increase in alkalinity is desired. The initial liquid may be an aqueous medium that may vary depending on the specific protocol being performed. Aqueous media of interest include pure water (e.g., fresh water) as well as water that includes one or more solutes, e.g., divalent cations, e.g., $Ca^{2+}$, $Mg^{2+}$, $Be^{2+}$, $Ba^{2+}$, $Sr^{2+}$, counterions, e.g., carbonate, hydroxide, etc. The aqueous medium may be a naturally occurring or man-made medium, as desired. Naturally occurring aqueous media include, but are not limited to, waters obtained from seas, oceans, lakes, swamps, estuaries, lagoons, brines, geological brines, alkaline lakes, inland seas, brackish waters, etc. Man-made sources of aqueous media may also vary, and may include brines produced by water desalination plants, waste waters, and the like. First and second liquid pairings of interest include, but are not limited to: fresh and salt water (e.g., river water and seawater), salt water and desalination waste water (e.g., RO retentate), fresh water charged with $CO_2$-containing gas, e.g., industrial flue gas, and salt water, fresh water and salt water charged with $CO_2$-containing gas, e.g., industrial flue gas, acidic salt water and fresh water and the like, or any combination of the waters disclosed herein.

In some embodiments, the first liquid is a carbonate buffered aqueous medium. Carbonate buffered aqueous media employed in methods of the invention include liquid media in which a carbonate buffer is present. As such, liquid aqueous media of interest include dissolved $CO_2$, water, carbonic acid ($H_2CO_3$), bicarbonate ions ($HCO_3^-$), hydrogen ions ($H^+$) and carbonate ions ($CO_3^{2-}$). The constituents of the carbonate buffer in the aqueous media are governed by the equation:

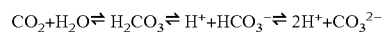

$$CO_2+H_2O \rightleftharpoons H_2CO_3 \rightleftharpoons H^+ + HCO_3^- \rightleftharpoons 2H^+ + CO_3^{2-}$$

Where desired, the initial liquid may be one that has been contacted with a $CO_2$-containing gas. In words, the initial liquid is one to which a gaseous source of $CO_2$ has been contacted such that the initial liquid that is subjected to the alkali enrichment protocol is one that includes an amount of dissolved inorganic carbon (DIC), i.e., it is a $CO_2$ charged liquid. In such instances, the $CO_2$ charged liquid includes an amount of dissolved $CO_2$. The amount of $CO_2$ dissolved in the liquid may vary, and in some instances ranges from 0.05 to 40 mM, such as 1 to 35 mM, including 25 to 30 mM. In this case, a $CO_2$ capture solution can be generated based on carbonate ion alkalinity. In some instances, carbonate ion alkalinity will be 100 mM or greater, such as 250 mM, and including 500-1,000 mM, or more. Such instances are described in greater detail below.

The second liquid employed in methods of the invention may vary. In some instances, the second liquid differs from the first liquid in terms of osmotic potential, where the osmotic potential of a given second liquid may be higher or lower relative to the initial liquid with which it is employed, depending on the particular alkali recover protocol that is used (e.g., as described above). The magnitude of the difference in osmotic potential between any two given liquid pairs may vary, and in some instances ranges from 0.1 bar to 150 bar, such as 20 bar to 60 bar, including 25 bar to 35 bar.

Any convenient liquid may be employed as the second liquid. In some embodiments, a second liquid may include a high ionic strength medium. In some embodiments, the second liquid contains non-hydrogen monovalent cations that are capable of crossing the membrane system to provide for charge balance and thereby facility in the alkalinity increase of the first liquid. In certain embodiments, the non-hydrogen monovalent cations include, but are not limited to: Na+, K+, and $NH_4^+$. Second liquids of interest include aqueous media having a salinity of 2 ppt or more, such as 5 ppt or more, including 10 ppt or more. In some instances the second liquid is an aqueous medium having a salinity that ranges from 3 to 50 ppt, such as 5 to 35 ppt. The pH of the second liquid may vary, and in some instances ranges from 4 to 12, such as 5 to 10 and including 6 to 9. In some instances, the second liquid may be referred to as a brine draw liquid. The term "brine" refers to water saturated or nearly saturated with salt and has a salinity that is 50 ppt (parts per thousand) or greater, such as 60 ppt or greater, and including 95 ppt or greater. Brine draw liquids of interest include, but are not limited to: man-made brines, such as geothermal plant wastewaters, oil field produced brines, fracking operation produced waters, desalination waste waters, etc., as well as natural brines, such as surface brines found in bodies of water on the surface of the earth and deep brines, found underneath the earth, as well as other liquids having a salinity as described above. In some embodiments, a draw liquid includes a geological brine or a brine discharge from a desalination plant.

Introduction of the first liquid and the second liquid into a membrane system, e.g., as described above, results in the production of a product liquid (i.e., enhanced alkalinity liquid) from the first liquid, where the product liquid has an increased alkalinity as compared to the first liquid, i.e., the product liquid is an enhanced alkalinity liquid. As summarized above, while the increase in alkalinity may vary, in some instances the magnitude of the increase in pH ranges from 0.1 to 10, such as 1 to 9, including 2.5 to 7.5, e.g., 3 to 7. While the pH of the product liquid may vary, in some instances the pH of the product liquid ranges from 5 to 14, such as 6 to 13, including 7 to 12, e.g., 8 to 11. In addition, methods of the invention may produce an acidic by-product liquid.

The acidic by-product liquid may vary, and is one that is produced from the second. The pH of the acidic by-product liquid ranges in some instances from 0 to 8, such as 3 to 5. The nature of the acidic by-product liquid may vary, where in some instances the acidic by-product liquid includes HCl.

Alkali enrichment protocols and systems for practicing the same that may be adapted for use methods of the invention, e.g., as described above, include those described in U.S. Patent Application No. 61/990,486 filed on May 8, 2014, U.S. Patent Application Ser. No. 62/051,100 filed on Sep. 16, 2014 and U.S. Patent Application No. 62/096,340 filed on Dec. 29, 2014; the disclosures of which are herein incorporated by reference. As indicated above, an alkali enrichment protocol (e.g., as described above) may be employed at one or more times during a $CO_2$ sequestration process, e.g., in producing a $CO_2$ capture liquid, to increase the alkalinity of a $CO_2$ contacted liquid (i.e., a liquid that includes dissolved inorganic carbon derived from $CO_2$), etc.

Production of Materials from the $CO_2$ Sequestering Carbonate Products

The product carbonate materials produced by the systems and methods, e.g., as described above, may be further manipulated and/or combined with other compositions to produce a variety of end-use materials. In certain embodiments, the product carbonate composition is refined (i.e., processed) in some manner. Refinement may include a variety of different protocols. In certain embodiments, the product is subjected to mechanical refinement, e.g., grinding, in order to obtain a product with desired physical properties, e.g., particle size, etc. In certain embodiments, the product is combined with a hydraulic cement, e.g., as a sand, a gravel, as an aggregate, etc., e.g., to produce final product, e.g., concrete or mortar.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 1 micron to 100 mm, such as 10 microns to 50 mm, e.g., 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles, roofing granules, etc.) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

Production of Pure Product $CO_2$ Gas

As described above, during the production of solid carbonate compositions from the bicarbonate rich product or component thereof (e.g., LCP), one mol of $CO_2$ may be produced for every 2 mols of bicarbonate ion from the bicarbonate rich product or component thereof (e.g., LCP). For example, where solid carbonate compositions are produced by adding calcium cation to the bicarbonate rich product or component thereof (e.g., LCP), the production of solid carbonate compositions, e.g., the form of amorphous calcium carbonate minerals, may proceed according to the following reaction:

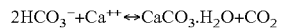

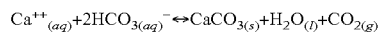

While the above reaction shows the production of 1 mol of $CO_2$, 2 moles of $CO_2$ from the $CO_2$ containing gas were initially converted to bicarbonate. As such, the overall process sequesters a net 1 mol of $CO_2$ in a carbonate compound and produces 1 mol of substantially pure CO2 product gas, which may be sequestered by injection into a subsurface geological location, as described in greater detail below. Therefore, the process is an effective $CO_2$ sequestration process. Contact of the bicarbonate rich product with the cation source results in production of a substantially pure $CO_2$ product gas. The phrase "substantially pure" means that the product gas is pure $CO_2$ or is a $CO_2$ containing gas that has a limited amount of other, non-$CO_2$ components.

Following production of the $CO_2$ product gas, aspects of the invention may include recovering the gas from the system and injecting the product $CO_2$ gas into a subsurface geological location to sequester $CO_2$. By injecting is meant introducing or placing the $CO_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

$CO_2$ gas production and sequestration thereof is further described in U.S. Provisional Application 62/054,322 filed on Sep. 23, 2014, the disclosure of which is herein incorporated by reference.

Methods of Producing $CO_2$ Sequestering Systems

Also provided are methods of producing (i.e., installing or fabricating) a $CO_2$ sequestration system at a $CO_2$ sequestration location. Aspects of these methods may include assessing the $CO_2$ sequestration requirements of a $CO_2$ sequestration location and then determining the configuration of a $CO_2$ sequestration system sufficient to meet the requirements of the $CO_2$ sequestration location. $CO_2$ sequestration locations may vary and include, but are not limited to, industrial sources of $CO_2$ gas, such as fossil fuel power plants, cement fabrication plants, etc., such as described above. In assessing the $CO_2$ sequestration requirements of a given $CO_2$ sequestration location, various parameters of the $CO_2$ sequestration location may be considered, including but not limited to, types of $CO_2$ containing gases that need to be treated, volumes of $CO_2$ contacting gas that need to be processed to remove $CO_2$, types of waters that may be available at the $CO_2$ sequestration location, power available at the location, desired type of carbonate product, etc.

After the $CO_2$ sequestration requirements of the $CO_2$ sequestration location are assessed or determined, a $CO_2$ sequestration system made up of a one or more shippable modular units, e.g., as described above, may be identified or determined which is sufficient to meet the requirements. The identification step may include considering the available different types of modular units and selecting a system of one or more units from the available units. For example, a given location may have $CO_2$ sequestration requirements that can be met by a single modular unit that includes AE, contact and carbonate production subunits and the determining step in such an instance may then include concluding that a single such modular unit can meet the requirements of the location or that the requirements can be made up of three separate modular units, i.e., one containing an AE subunit, one containing a contactor subunit and one containing a carbonate production subunit. Alternatively, a given location may have $CO_2$ sequestration requirements that can be met by two or more modular units each of which includes a different type of subunit. For example, the determined requirements of a given location may require the $CO_2$ gas processing capacity of three contactor modular units, two AE modular units and three carbonate production units. A suitable system made up of two or more distinct modular units may then be identified from the available modular units, e.g., a system that includes three contactor modular units, two AE modular units and three carbonate production units or a system that includes two AE modular units, and three modular units that each contain contactor and carbonate production subunits.

Aspects of the methods may include transporting the system of one or more modular units to the $CO_2$ sequestration location from a remote location, which remote location may be a fabrication and/or storage location. In such instances the remote location may be a variety of distances from the $CO_2$ sequestration location, e.g., 1 km or more, 5 km or more, 50 km or more, 100 km or more, 500 km or more, 1000 km or more, 5000 km or more, 10,000 km or more, etc. In such instances, the system of one or more modular units may be transported or shipped from the remote location to the sequestration location using any convenient transportation route, e.g., by boat, truck, train, plane, etc.

Aspects of embodiments of the methods of installing the systems may include operably coupling one or more modular units to each other and/or one or more sources of input materials, e.g., water(s), $CO_2$ containing gases, sources of divalent cations, etc. For example, where a system includes three distinct modular units, i.e., an AE unit, a contact unit and a carbonate production unit, the methods may include operably coupling the AE unit to first and second sources of water (e.g., high and low salinity waters), operably coupling the contactor unit to the alkalinity enriched liquid output of the AE unit and a source of $CO_2$ containing gas, and operably coupling the carbonate production unit to the bicarbonate containing liquid output of the contactor unit and the a divalent source of cations. Installation may include operably coupling two or more units to each other, e.g., an AE unit with the contactor unit, a contactor unit with a carbonate production unit, etc. Installation may further include operatively coupling the one or more units of the system with one or more receivers for products of the units, e.g., a carbonate product receiver, a pure $CO_2$ gas receiver, an acidic byproduct liquid receiver, a $CO_2$ depleted gas receiver, etc.

Utility

Modular units, systems thereof and methods as described herein find use in $CO_2$ sequestration applications. As reviewed above, by "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$, producing a storage stable carbon dioxide sequestering product from an amount of $CO_2$ such that the $CO_2$ from which the product is produced is then sequestered in that product. The storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Depending on the particular embodiment, the storage stable form may be a liquid or a solid. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Notwithstanding the appended clauses, the disclosure is also defined by the following clauses:

1. A shippable modular unit configured for use in sequestering $CO_2$ from a gaseous source of $CO_2$, the shippable modular unit comprising:
   (a) a support; and
   (b) at least one type of subunit selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
   associated with the support.

2. The shippable modular unit according to Clause 1, wherein the shippable modular unit includes only one type of subunit selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
   present in the housing.

3. The shippable modular unit according to Clauses 1 or 2, wherein the type of subunit is a $CO_2$ gas/liquid contactor subunit.

4. The shippable modular unit according to Clauses 1 or 2, wherein the type of subunit is a carbonate production subunit.

5. The shippable modular unit according to Clauses 1 or 2, wherein the type of subunit is an alkali enrichment subunit.

6. The shippable modular unit according to Clause 1, wherein the modular unit includes at least two types of subunits selected from the group consisting of: a $CO_2$ gas/liquid contactor subunit; a carbonate production subunit; and an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
present in the housing.

7. The shippable modular unit according to Clause 6, wherein the at least two types of subunits comprise: a $CO_2$ gas/liquid contactor subunit; and a carbonate production subunit.

8. The shippable modular unit according to Clause 6, wherein the at least two types of subunits comprise: a $CO_2$ gas/liquid contactor subunit; and an alkali enrichment subunit.

9. The shippable modular unit according to Clause 6, wherein the at least two types of subunits comprise: a carbonate production subunit; and an alkali enrichment subunit.

10. The shippable modular unit according to any of Clauses 1 to 9, wherein the shippable modular unit is configured to be operatively coupled to one or more additional shippable modular units each comprising:
    (a) a support; and
    (b) at least one type of subunit selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
    associated with the support.

11. The shippable modular unit according to any of the preceding clauses, wherein the shippable modular unit is configured to be transported by rail.

12. The shippable modular unit according to any of Clauses 1 to 10, wherein the shippable modular unit is configured to be transported by truck.

13. The shippable modular unit according to any of Clauses 1 to 10, wherein the shippable modular unit is configured to be transported by boat.

14. The shippable modular unit according to any of Clauses 1 to 13, wherein the housing has an internal volume ranging from 8 to 30,000 m$^3$.

15. The shippable modular unit according to any of Clauses 1 to 14, wherein the shippable modular unit has a mass ranging from 1 ton to 20,000 tons.

16. A system configured to sequester $CO_2$ from a gaseous source of $CO_2$, the system comprising:
    two or more operably coupled shippable modular units, each shippable modular unit comprising:
    (a) a housing having at least one material input and least one product output; and
    (b) at least one type of subunit selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
    present in the housing.

17. The system according to Clause 16, wherein the housing of at least one of the shippable modular units includes only one type of subunit selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
present in the housing.

18. The system according to Clause 17, wherein the type of subunit is a $CO_2$ gas/liquid contactor subunit.

19. The system according to Clause 17, wherein the type of subunit is a carbonate production subunit.

20. The system according to Clause 17, wherein the type of subunit is an alkali enrichment subunit.

21. The system according to Clause 16, wherein the housing of at least one of the shippable modular units comprises at least two types of subunits selected from the group consisting of: a $CO_2$ gas/liquid contactor subunit; a carbonate production subunit; an alkali enrichment subunit; a water softening subunit; a cation recovery subunit; a heat exchange subunit; a reverse osmosis subunit; a nanofiltration subunit; a microfiltration subunit; an ultrafiltration subunit; and a purified $CO_2$ collection subunit;
present in the housing.

22. The system according to Clause 21, wherein the at least two types of subunits comprise: a $CO_2$ gas/liquid contactor subunit; and a carbonate production subunit.

23. The system according to Clause 21, wherein the at least two types of subunits comprise: a $CO_2$ gas/liquid contactor subunit; and an alkali enrichment subunit.

24. The system according to Clause 21, wherein the at least two types of subunits comprise: a carbonate production subunit; and an alkali enrichment subunit.

25. The system according to any of Clauses 16 to 24, wherein the system is configured to process 1,000 to 10,000,000 scfm of a gaseous source of $CO_2$.

26. The system according to any of Clauses 16 to 25, wherein the gaseous source of $CO_2$ is a multicomponent gaseous stream.

27. The system according to Clause 16, wherein the multicomponent gaseous stream is a flue gas.

28. The system according to any of Clauses 16 to 26, wherein the system is configured to process 100 to 10,000,000 liters/hr of an input liquid material.

29. The system according to any of Clauses 16 to 28, wherein the system is operably coupled to a source of an initial liquid.

30. The system according to Clause 29, wherein the initial liquid is selected from the group consisting of freshwater, seawater, brine water, produced water and waste water.

31. The system according to any of Clauses 16 to 30, wherein the system is operatively coupled to a gaseous source of $CO_2$.

32. The system according to Clause 31, wherein the gaseous source of $CO_2$ is a multi-component gaseous stream.

33. The system according to Clause 32, wherein the gaseous source of $CO_2$ is a flue gas.

34. The system according to Clause 33, wherein the flue gas is obtained from an industrial source.

35. The system according to Clause 34, wherein the industrial source is a power plant.

36. A method of producing a system configured to sequester $CO_2$ from a gaseous source of $CO_2$ at a $CO_2$ sequestration location, the method comprising:

assessing the $CO_2$ sequestration requirements of the $CO_2$ sequestration location; and determining the configuration of a $CO_2$ sequestration system sufficient to meet the requirements of the $CO_2$ sequestration location.

37. The method according to Clause 36, wherein the $CO_2$ sequestration system comprises one or more shippable modular $CO_2$ sequestration units.

38. The method according to Clause 37, wherein the $CO_2$ sequestration system comprises a shippable modular $CO_2$ sequestration unit comprising each of a $CO_2$ gas/liquid contactor subunit; a carbonate production subunit; and an alkali enrichment subunit.

39. The method according to Clause 37, wherein the $CO_2$ sequestration system comprises a two or more shippable modular $CO_2$ sequestration units each comprising at least one of: a $CO_2$ gas/liquid contactor subunit; a carbonate production subunit; and an alkali enrichment subunit.

40. The method according to any of Clauses 36 to 39, wherein the method further comprises operably coupling the two or more shippable modular units at the $CO_2$ sequestration location to produce the system.

41. The method according to any of Clauses 36 to 40, wherein the method further comprises operably coupling the system to a gaseous source of $CO_2$.

42. The method according to Clause 41, wherein the gaseous source of $CO_2$ is a multi-component gaseous stream.

43. The method according to Clause 42, wherein the gaseous source of $CO_2$ is a flue gas.

44. The method according to Clause 43, wherein the flue gas is obtained from an industrial source.

45. The method according to Clause 44, wherein the industrial source is a power plant.

46. The method according to any of Clauses 36 to 45, wherein the method further comprises shipping the determined $CO_2$ sequestration system to the $CO_2$ sequestration location from a remote location.

47. The method according to Clause 46, wherein the shipping is by rail.

48. The method according to Clause 46, wherein the shipping is by truck.

49. The method according to Clause 46, wherein the shipping is by boat.

50. The method according to any of Clauses 46 to 49, wherein the method further comprises fabricating the system at the remote location.

51. A method for sequestering $CO_2$ from a gaseous source of $CO_2$, the method comprising:

(a) introducing a gaseous source of $CO_2$ into a system according to any of Clauses 16 to 35; and (b) obtaining a carbonate product material from the modular unit.

52. The method according to Clause 51, wherein the method comprises processing 1,000 to 10,000,000 scfm of a gaseous source of $CO_2$.

53. The method according to any of Clauses 51 to 52, wherein the gaseous source of $CO_2$ is a multi-component gaseous stream.

54. The method according to Clause 53, wherein the gaseous source of $CO_2$ is a flue gas.

55. The method according to Clause 54, wherein the flue gas is obtained from an industrial source.

56. The method according to any of Clauses 51 to 55, wherein the method comprises processing 1,000 to 10,000,000 liters/hr of an input liquid.

57. The method according to Clause 56, wherein the carbonate product material comprises a slurry.

58. The method according to Clause 56, wherein the carbonate product material comprises a non-slurry.

59. A shippable modular unit configured to sequester $CO_2$ from a gaseous source of $CO_2$, the modular unit comprising:
a housing containing:
a $CO_2$ gas/liquid contactor subunit operatively connected to a first input for a liquid and a second input for a gaseous source of $CO_2$; and
a carbonate production subunit in fluidic communication with the contactor unit;
wherein the carbonate production unit is operatively connected to a $CO_2$ product gas output and a carbonate product material output.

60. The shippable modular unit according to Clause 59, wherein the modular unit is configured to process 1,000 to 10,000,000 scfm of a gaseous source of $CO_2$.

61. The shippable modular unit according to Clauses 59 or 60, wherein the gaseous source of $CO_2$ is a multicomponent gaseous stream.

62. The shippable modular unit according to Clause 61, wherein the multicomponent gaseous stream is a flue gas.

63. The shippable modular unit according to any of Clauses 59 to 62, wherein the modular unit is configured to process 1,000 to 10,000,000 liters/hr of an input liquid.

64. The shippable modular unit according to any of Clauses 59 to 62, wherein the modular unit further comprises an alkali enrichment subunit.

65. The shippable modular unit according to Clause 64, wherein the alkali enrichment subunit is operatively coupled to the $CO_2$ gas/liquid contactor subunit and configured to produce an enhanced alkalinity liquid from an initial liquid for use as a $CO_2$ capture liquid in the $CO_2$ gas/liquid contactor unit.

66. The shippable modular unit according to Clause 65, wherein the alkali enrichment subunit is configured to receive $CO_2$ charged liquid from the $CO_2$ gas/liquid contactor subunit and produce an enhanced alkalinity liquid from the received $CO_2$ charged liquid.

67. The shippable modular unit according to any of Clauses 64 to 66, wherein the alkali enrichment subunit is operatively coupled to a first input for a first liquid and a second input for a second liquid.

68. The shippable modular unit according to any of Clause 59 to 67, wherein the carbonate production subunit is operatively coupled to an input for a divalent cation source.

69. The shippable modular unit according to Clause 68, wherein the divalent cation source is a hard water source.

70. The shippable modular unit according to any of Clauses 59 to 69, wherein the housing has a volume ranging from 8 to 30,000 $m^3$.

71. A shippable modular unit configured to sequester $CO_2$ from a gaseous source of $CO_2$, the modular unit comprising:
a housing comprising:
an alkali enrichment subunit configured to produce an enhanced alkalinity liquid from an initial liquid, wherein the alkali enrichment subunit is operatively coupled to a first input for the initial liquid and a second input for a second liquid;
a $CO_2$ gas/liquid membrane contactor subunit configured to receive an enhanced alkalinity liquid from the alkali enrichment subunit and produce a liquid condensed phase (LCP) containing liquid, wherein the $CO_2$ gas/liquid membrane contactor subunit is operatively coupled to an input for a gaseous source of $CO_2$ and an output for treated gas; and
a carbonate production subunit in fluidic communication with the $CO_2$ gas/liquid membrane contactor subunit, wherein the carbonate production subunit is operatively coupled to an input for a liquid divalent cation source, a $CO_2$ product gas output and a carbonate product material output.

72. The shippable modular unit according to Clause 71, wherein the modular unit is configured to process 1,000 to 10,000,000 scfm of a gaseous source of $CO_2$.

73. The shippable modular unit according to Clauses 71 or 72, wherein the gaseous source of $CO_2$ is a multicomponent gaseous stream.

74. The shippable modular unit according to any of Clauses 73, wherein multicomponent gaseous stream is a flue gas.

75. The shippable modular unit according to any of Clauses 71 to 74, wherein the first and second inputs of the alkali enrichment subunit are respectively operatively coupled to a source of the initial liquid and a source of the second liquid.

76. The shippable modular unit according to Clause 75, wherein the initial liquid and second liquid are selected from the group consisting of freshwater, seawater, brine water, produced water and waste water.

77. The shippable modular unit according to any of Clauses 71 to 76, wherein the input for a gaseous source of $CO_2$ is operatively coupled to a gaseous source of $CO_2$.

78. The shippable modular unit according to any of Clauses 71 to 76, wherein the gaseous source of $CO_2$ is a multi-component gaseous stream.

79. The shippable modular unit according to Clause 78, wherein the gaseous source of $CO_2$ is a flue gas.

80. The shippable modular unit according to Clause 79, wherein the flue gas is obtained from an industrial source.

81. The shippable modular unit according to any of Clauses 71 to 80, wherein the $CO_2$ gas/liquid membrane contactor subunit comprises a hollow fiber membrane.

82. The shippable modular unit according to any of Clauses 71 to 81, wherein the carbonate production subunit is configured to introduce the liquid divalent cation source into a flowing LCP containing liquid produced by the contactor subunit under conditions sufficient such that a non-slurry solid phase $CO_2$ sequestering carbonate material is produced in the flowing LCP containing liquid.

83. The shippable modular unit according to any of Clauses 71 to 82, wherein the carbonate production subunit comprises a fluidized bed.

84. The shippable modular unit according to any of Clauses 71 to 83, wherein the carbonate production subunit is configured to introduce the liquid divalent cation source into a LCP containing liquid produced by the contactor unit under conditions sufficient such that a slurry $CO_2$ sequestering carbonate material is produced from the LCP containing liquid.

85. The shippable modular unit according to any of Clauses 71 to 84, wherein the carbonate production subunit is operatively coupled to a waste liquid disposal output.

86. A shippable modular unit configured to sequester $CO_2$ from a gaseous source of $CO_2$, the modular unit comprising:
 a housing containing:
  a $CO_2$ gas/liquid membrane contactor subunit configured to produce a liquid $CO_2$ charged liquid, wherein the $CO_2$ gas/liquid membrane contactor subunit is operatively coupled to an input for a gaseous source of $CO_2$, an input for an initial liquid, a first output for a $CO_2$ charged liquid and a second output for treated gas;
  an alkali enrichment subunit operatively coupled to the first output of the $CO_2$ gas/liquid membrane contactor subunit and configured to produce an enhanced alkalinity liquid from $CO_2$ charged liquid received from the $CO_2$ gas/liquid membrane contactor subunit, wherein the alkali enrichment subunit is operatively coupled to a first input for the initial liquid and a second input for a second liquid; and
  a carbonate production subunit configured to receive an enhanced alkalinity liquid from the alkali enrichment subunit and operatively coupled to an input for a liquid divalent cation source, a $CO_2$ product gas output and a carbonate product material output.

87. The shippable modular unit according to Clause 86, wherein the modular unit is configured to process 1,000 to 10,000,000 scfm of a gaseous source of $CO_2$.

88. The shippable modular unit according to any of Clauses 86 or 87, wherein the initial liquid and second liquid are selected from the group consisting of freshwater, seawater, brine water, produced water and waste water.

89. The shippable modular unit according to any of Clauses 86 to 88, wherein the input for a gaseous source of $CO_2$ is operatively coupled to a gaseous source of $CO_2$.

90. The shippable modular unit according to any of Clauses 86 to 89, wherein the gaseous source of $CO_2$ is a multi-component gaseous stream.

91. The shippable modular unit according to Clause 90, wherein the gaseous source of $CO_2$ is a flue gas.

92. The shippable modular unit according to Clause 91, wherein the flue gas is obtained from an industrial source.

93. The shippable modular unit according to any of Clauses 86 to 92, wherein the $CO_2$ gas/liquid membrane contactor subunit comprises a hollow fiber membrane.

94. The shippable modular unit according to any of Clauses 86 to 93, wherein the carbonate production subunit is configured to introduce the liquid divalent cation source into a flowing LCP containing liquid produced by the contactor subunit under conditions sufficient such that a non-slurry solid phase $CO_2$ sequestering carbonate material is produced in the flowing LCP containing liquid.

95. The shippable modular unit according to any of Clauses 86 to 94, wherein the carbonate production unit comprises a fluidized bed.

96. The shippable modular unit according to any of Clauses 86 to 95, wherein the carbonate production subunit is configured to introduce the liquid divalent cation source into a LCP containing liquid produced by the contactor unit under conditions sufficient such that a slurry $CO_2$ sequestering carbonate material is produced from the LCP containing liquid.

97. The shippable modular unit according to any of Clauses 86 to 96, wherein the carbonate production subunit is operatively coupled to a waste liquid disposal output.

98. A method for sequestering $CO_2$ from a gaseous source of $CO_2$, the method comprising:
 (a) introducing a gaseous source of $CO_2$ into a shippable modular unit configured to sequester $CO_2$ from a gaseous source of $CO_2$, the modular unit comprising a housing containing:
  a $CO_2$ gas/liquid contactor subunit operatively connected to a first input for a liquid and a second input for a gaseous source of $CO_2$; and
  a carbonate production subunit in fluidic communication with the contactor subunit,
  wherein the carbonate production subunit is operatively connected to a $CO_2$ product gas output and a carbonate product material output; and
 (b) obtaining a carbonate product material from the modular unit.

99. The method according to Clause 98, wherein the method comprises processing 1,000 to 10,000,000 scfm of a gaseous source of $CO_2$.

100. The method according to Clause 99, wherein the gaseous source of $CO_2$ is a multi-component gaseous stream.

101. The method according to Clause 100, wherein the gaseous source of $CO_2$ is a flue gas.

102. The method according to Clause 101, wherein the flue gas is obtained from an industrial source.

103. The method according to any of Clauses 98 to 102, wherein the modular unit further comprises an alkali enrichment subunit and the method further comprises producing an enhanced alkalinity liquid.

104. The method according to any of Clauses 98 to 103, wherein the modular unit is configured to process 1,000 to 10,000,000 liters/hr of an input liquid.

105. The method according to any of Clauses 98 to 104, wherein the carbonate product material comprises a slurry.

106. The method according to any of Clauses 98 to 104, wherein the carbonate product material comprises a non-slurry.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A shippable modular unit configured for use in sequestering $CO_2$ from a gaseous source of $CO_2$, the shippable modular unit comprising:
   (a) a housing;
   (b) a $CO_2$ gas/liquid contactor subunit associated with the housing;
   (c) a carbonate production subunit associated with the housing and configured to produce a solid phase $CO_2$ sequestering carbonate material in association with a seed structure; and
   (d) the seed structure present within the carbonate production subunit comprising at least one component selected from the group consisting of sand, a shell fragment, gravel, pulverized rock, cement kiln dust, red mud, coarse aggregate, and friable Pleistocene coral rock.

2. The shippable modular unit according to claim 1, wherein the shippable modular unit is configured to be operatively coupled to one or more additional shippable modular units each comprising:
   (a) a support; and
   (b) at least one type of subunit selected from the group consisting of:
      a $CO_2$ gas/liquid contactor subunit;
      a carbonate production subunit; and
      an alkali enrichment subunit;
      a water softening subunit;
      a cation recovery subunit;
      a heat exchange subunit;
      a reverse osmosis subunit;
      a nanofiltration subunit;
      a microfiltration subunit;
      an ultrafiltration subunit; and
      a purified $CO_2$ collection subunit;
   associated with the support.

3. The shippable modular unit according to claim 1, wherein the shippable modular unit is configured to be transported by rail.

4. The shippable modular unit according to claim 1, wherein the shippable modular unit is configured to be transported by truck.

5. The shippable modular unit according to claim 1, wherein the shippable modular unit is configured to be transported by boat.

6. The shippable modular unit according to claim 1, wherein the housing has an internal volume ranging from 8 to 30,000 $m^3$.

7. The shippable modular unit according to claim 1, wherein the shippable modular unit has a mass ranging from 1 ton to 20,000 tons.

8. The shippable modular unit according to claim 1, wherein the seed structure comprises at least one component selected from the group consisting of gravel, pulverized rock, friable Pleistocene coral rock, and coarse aggregate.

9. The shippable modular unit according to claim 1, wherein the seed structure comprises a component comprising internal pores.

10. The shippable modular unit according to claim 1, wherein the seed structure comprises at least one component selected from the group consisting of sand and gravel.

11. A system configured to sequester $CO_2$ from a gaseous source of $CO_2$, the system comprising:
   two or more operably coupled shippable modular units, each shippable modular unit comprising:
   (a) a housing having at least one material input and least one product output;
   (b) a $CO_2$ gas/liquid contactor subunit present in the housing;
   (c) a carbonate production subunit present in the housing and configured to produce a solid phase $CO_2$ sequestering carbonate material in association with a seed structure; and
   (d) the seed structure present within the carbonate production subunit comprising at least one component selected from the group consisting of sand, a shell fragment, gravel, pulverized rock, cement kiln dust, red mud, coarse aggregate, and friable Pleistocene coral rock.

12. The shippable modular unit according to claim 11, wherein the seed structure comprises a component comprising internal pores.

13. A method for sequestering $CO_2$ from a gaseous source of $CO_2$, the method comprising:

(a) introducing a gaseous source of $CO_2$ into a system according to claim 11; and
(b) obtaining a carbonate product material from the modular unit.

* * * * *

UNITED STATES PATENT AND TRADEMARK OFFICE
CERTIFICATE OF CORRECTION

PATENT NO. : 11,154,813 B2
APPLICATION NO. : 15/562405
DATED : October 26, 2021
INVENTOR(S) : Brent R. Constantz Page 1 of 1

It is certified that error appears in the above-identified patent and that said Letters Patent is hereby corrected as shown below:

In the Specification

Please replace "$10^2$ or more" with -- $10^2$ $s^{-1}$ or more -- (Column 27, Line 47).

Please replace "$10^2$ or more" with -- $10^2$ $s^{-1}$ or more -- (Column 27, Line 65).

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*